United States Patent
Mishra et al.

(10) Patent No.: US 11,113,053 B2
(45) Date of Patent: *Sep. 7, 2021

(54) DATA ELEMENT COMPARISON PROCESSORS, METHODS, SYSTEMS, AND INSTRUCTIONS

(71) Applicant: Intel Corporation, Santa Clara, CA (US)

(72) Inventors: Asit K. Mishra, Hillsboro, OR (US); Edward T. Grochowski, San Jose, CA (US); Jonathan D. Pearce, Hillsboro, OR (US); Deborah T. Marr, Portland, OR (US); Ehud Cohen, Kiryat Motskin (IL); Elmoustapha Ould-Ahmed-Vall, Chandler, AZ (US); Jesus Corbal San Adrian, Hillsboro, OR (US); Robert Valentine, Kiryat Tivon (IL); Mark J. Charney, Lexington, MA (US); Christopher J. Hughes, Santa Clara, CA (US); Milind B. Girkar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,394

(22) Filed: Sep. 23, 2019

(65) Prior Publication Data
US 2020/0089494 A1    Mar. 19, 2020

Related U.S. Application Data

(63) Continuation of application No. 14/866,921, filed on Sep. 26, 2015, now Pat. No. 10,423,411.

(51) Int. Cl.
*G06F 9/30* (2018.01)

(52) U.S. Cl.
CPC ........ *G06F 9/30021* (2013.01); *G06F 9/3001* (2013.01); *G06F 9/3013* (2013.01);
(Continued)

(58) Field of Classification Search
None
See application file for complete search history.

(56) References Cited

U.S. PATENT DOCUMENTS

| 5,341,500 A | 8/1994 | Moyer et al. |
| 5,651,121 A | 7/1997 | Davies |

(Continued)

FOREIGN PATENT DOCUMENTS

| TW | 201533660 A | 9/2015 |
| WO | 2017/052917 A1 | 3/2017 |

OTHER PUBLICATIONS

Office Action, TW App. No. 105127098, dated May 6, 2020, 16 pages (8 pages of English Translation and 8 pages of Original Document).

(Continued)

*Primary Examiner* — John M Lindlof
(74) *Attorney, Agent, or Firm* — Nicholson De Vos Webster & Elliott LLP

(57) ABSTRACT

A processor includes a decode unit to decode an instruction that is to indicate a first source packed data operand that is to include at least four data elements, to indicate a second source packed data operand that is to include at least four data elements, and to indicate one or more destination storage locations. The execution unit, in response to the instruction, is to store at least one result mask operand in the destination storage location(s). The at least one result mask operand is to include a different mask element for each corresponding data element in one of the first and second source packed data operands in a same relative position.

(Continued)

Each mask element is to indicate whether the corresponding data element in said one of the source packed data operands equals any of the data elements in the other of the source packed data operands.

20 Claims, 24 Drawing Sheets

(52) U.S. Cl.
CPC ........ *G06F 9/3016* (2013.01); *G06F 9/30018* (2013.01); *G06F 9/30032* (2013.01); *G06F 9/30036* (2013.01); *G06F 9/30101* (2013.01)

(56) References Cited

U.S. PATENT DOCUMENTS

| | | | |
|---|---|---|---|
| 6,036,350 | A | 3/2000 | Mennemeier et al. |
| 7,958,181 | B2 | 6/2011 | Kapoor et al. |
| 8,819,394 | B2 | 8/2014 | Julier et al. |
| 2002/0002666 | A1 | 1/2002 | Dulong et al. |
| 2008/0071851 | A1 | 3/2008 | Zohar et al. |
| 2012/0166761 | A1 | 6/2012 | Hughes et al. |
| 2013/0212361 | A1 | 8/2013 | Julier et al. |
| 2014/0040601 | A1* | 2/2014 | Fleischer .............. G06F 9/3887 712/208 |
| 2014/0089634 | A1 | 3/2014 | Lee et al. |
| 2014/0095779 | A1 | 4/2014 | Forsyth et al. |
| 2014/0181466 | A1 | 6/2014 | Forsyth et al. |
| 2014/0189308 | A1 | 7/2014 | Hughes et al. |
| 2014/0281418 | A1 | 9/2014 | Kuo |
| 2014/0289503 | A1 | 9/2014 | Toll et al. |
| 2014/0351567 | A1 | 11/2014 | Plotnikov et al. |
| 2015/0186141 | A1 | 7/2015 | Plotnikov |
| 2016/0224514 | A1* | 8/2016 | Moudgill ............ G06F 15/8053 |
| 2016/0283240 | A1 | 9/2016 | Mishra et al. |

OTHER PUBLICATIONS

Intel "Instruction Set Reference, N-Z", Chapter-4, vol. 2B, 13 pages.
Intel, "Intel 64 and IA-32 Architectures Software Developer's Manual", vol. 1: Basic Architecture, Order No. 253665-040US, Oct. 2011, 548 pages.
Intel, "Intel 64 and IA-32 Architectures Software Developer's Manual", vol. 2 (2A, 28 & 2C): Instruction Set Reference, A-Z, Order No. 325383-040US, Oct. 2011, 1721 pages.
Intel, "Intel 64 and IA-32 Architectures Software Developer's Manual", vol. 3 (3A, 3B & 3C): System Programming Guide, Order No. 325384-040US, Oct. 2011, 1916 pages.
Intel, "Intel Advanced Vector Extensions Programming Reference", Jun. 2011, 595 pages.
International preliminary Report on Patentability for Application No. PCT/US2016/048370, dated Apr. 5, 2018, 8 pages.
International Search Report and Written Opinion received for PCT Patent Application No. PCT/US2016/048370, dated Nov. 25, 2016, 11 pages.
Notice of Allowance, TW App. No. 105127098, dated Sep. 28, 2020, 3 pages (1 page of English Translation and 2 pages of Original Document).

\* cited by examiner

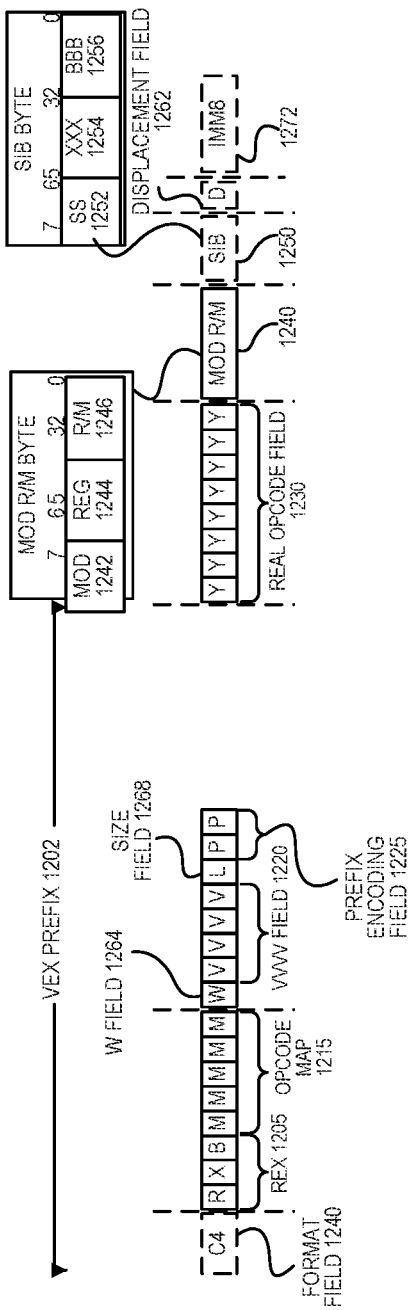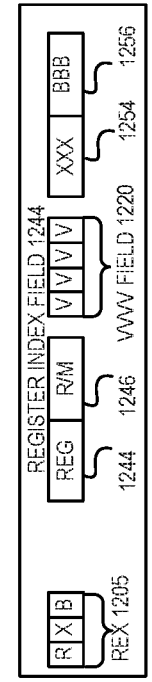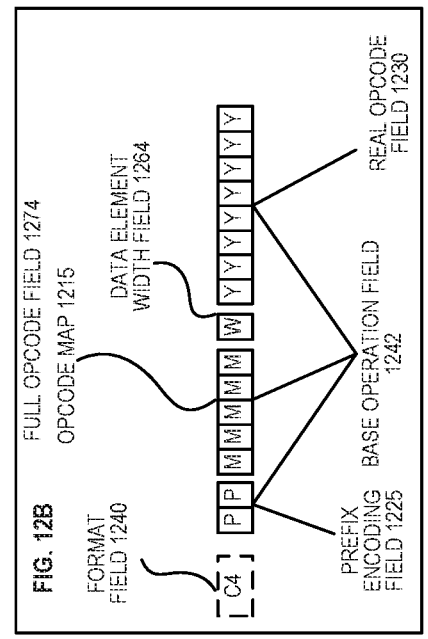
FIG. 12A
FIG. 12B
FIG. 12C

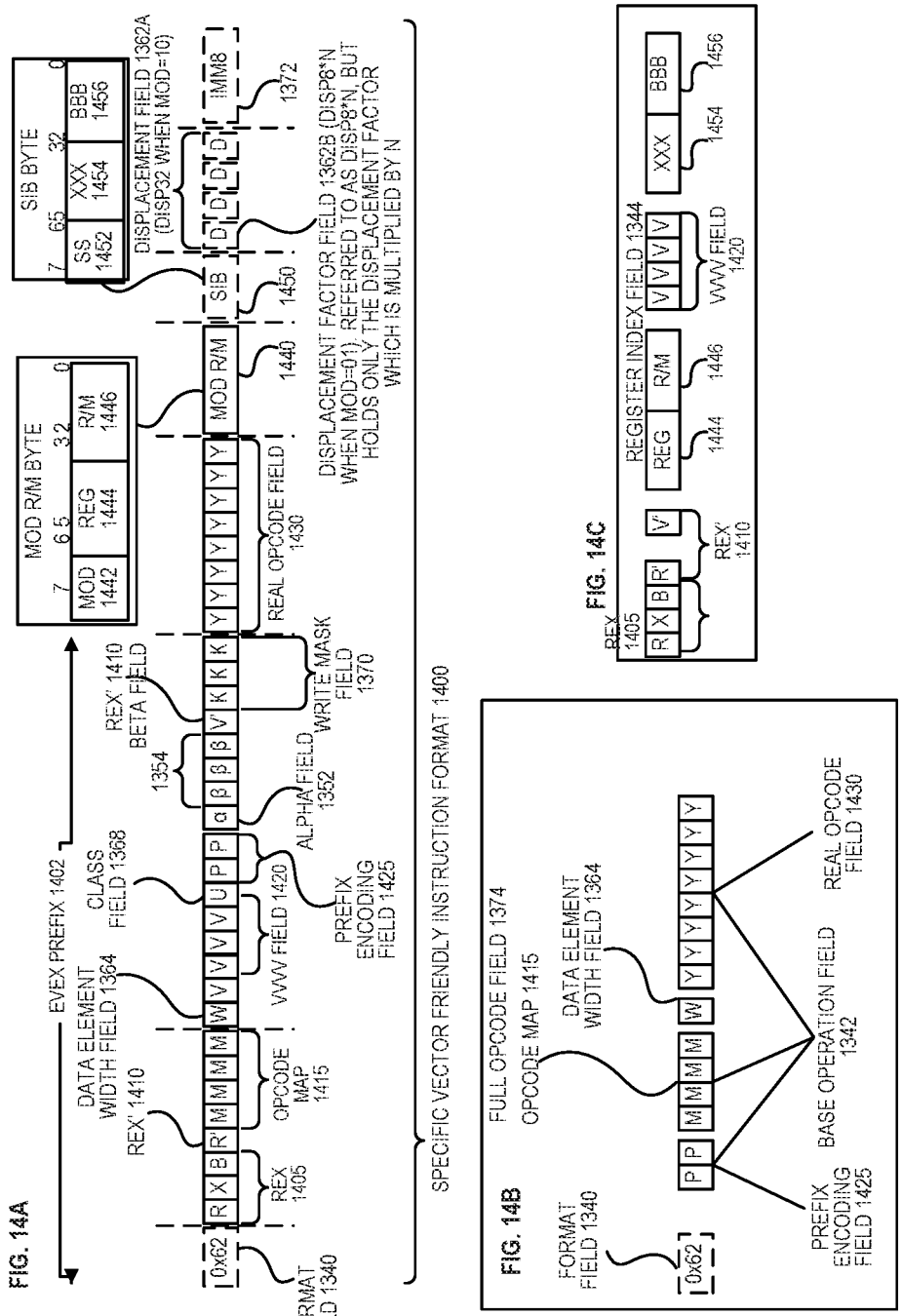

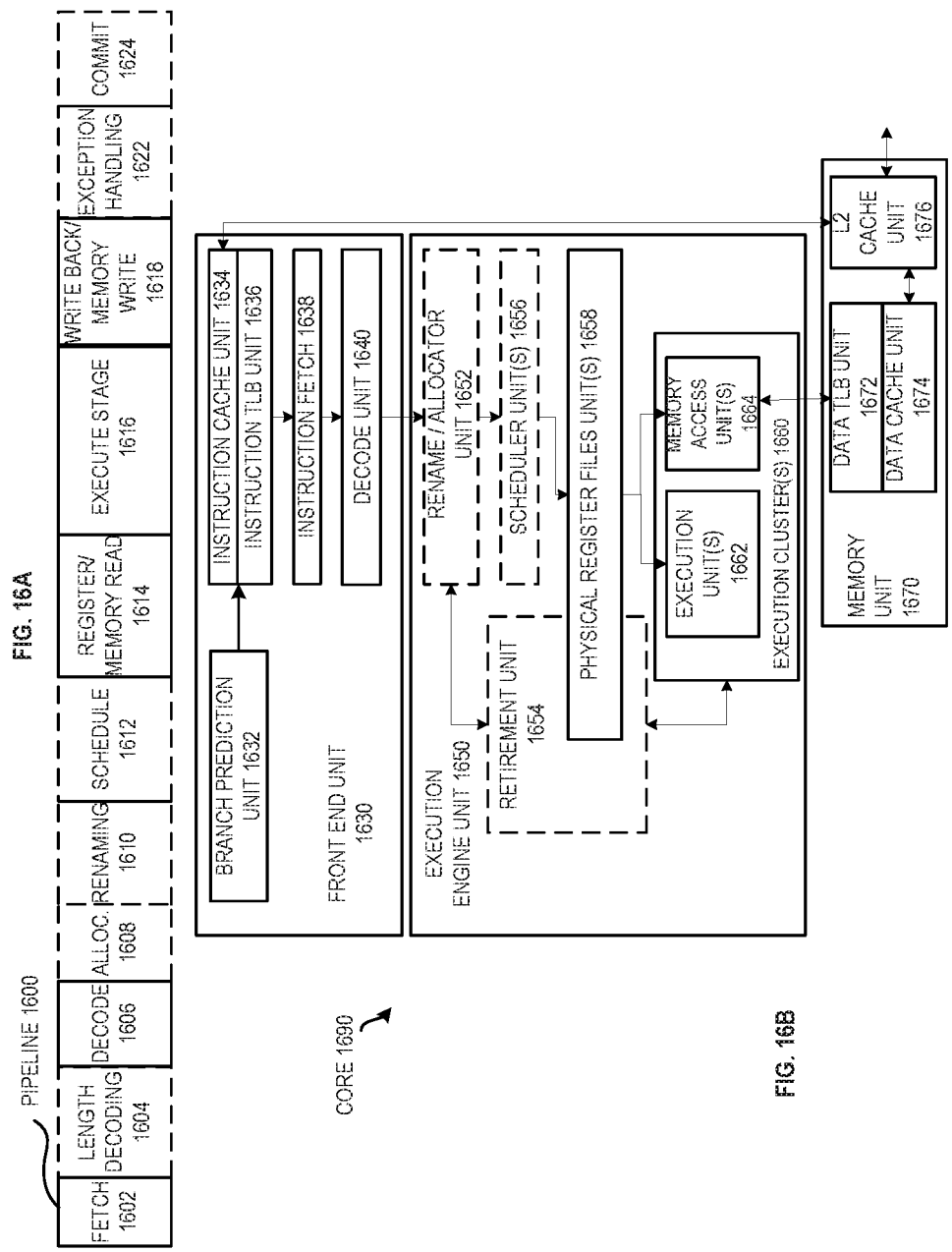

DATA ELEMENT COMPARISON PROCESSORS, METHODS, SYSTEMS, AND INSTRUCTIONS

CLAIM TO PRIORITY

The present application is a continuation of U.S. patent application Ser. No. 14/866,921, entitled, "DATA ELEMENT COMPARISON PROCESSORS, METHODS, SYSTEMS, AND INSTRUCTIONS" filed on Sep. 26, 2015, which is hereby incorporated herein by reference.

BACKGROUND

Technical Field

Embodiments described herein generally relate to processors. In particular, embodiments described herein generally relate to processors to process packed data operands.

Background Information

Many processors have Single Instruction, Multiple Data (SIMD) architectures. In SIMD architectures, a packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel.

Multiple data elements may be packed within one register or memory location as packed data or vector data. In packed data, the bits of the register or other storage location may be logically divided into a sequence of data elements. For example, a 256-bit wide packed data register may have four 64-bit wide data elements, eight 32-bit data elements, sixteen 16-bit data elements, etc. Each of the data elements may represent a separate individual piece of data (e.g., a pixel color, a component of a complex number, etc.), which may be operated upon separately and/or independently of the others.

BRIEF DESCRIPTION OF THE DRAWINGS

The invention may best be understood by referring to the following description and accompanying drawings that are used to illustrate embodiments. In the drawings:

FIGS. 12A-C are block diagrams illustrating a generic vector friendly instruction format and instruction templates thereof, according to embodiments of the invention.

FIG. 14A-D is a block diagram illustrating an exemplary specific vector friendly instruction format and fields thereof, according to embodiments of the invention.

FIG. 16A is a block diagram illustrating an embodiment of an in-order pipeline and an embodiment of a register renaming out-of-order issue/execution pipeline.

FIG. 16B is a block diagram of an embodiment of processor core including a front end unit coupled to an execution engine unit and both coupled to a memory unit.

DETAILED DESCRIPTION OF EMBODIMENTS

Disclosed herein are data element comparison instructions, processors to execute the instructions, methods performed by the processors when processing or executing the instructions, and systems incorporating one or more processors to process or execute the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

The data element comparison instructions disclosed herein are general-purpose instructions and are not limited to any known use. Rather, these instructions may be used for different purposes and/or in different ways based on the creativity of the programmer, compiler, or the like. In some embodiments, these instructions may be used to process data that is associated with sparse matrices, although the scope of the invention is not so limited. In some embodiments, these instructions may be used to process data associated with a compressed sparse row (CSR) representation, although the scope of the invention is not so limited. To further illustrate certain concepts, specific uses of these instructions to process indices in a CSR format, which may be used to represent indices and values of a sparse matrix, will be described, although it is to be appreciated that this is just one possible use of these instructions. Representatively, this may be useful in data analytics, high performance computing, machine learning, sparse linear algebra problems, and the like. In other embodiments, these instructions may be used to process other types of data besides sparse matrices and/or CSR format data. For example, these instructions may be used to process various different types of data, such as, for example, multimedia data, graphics data, sound data, video data, pixels, text string data, character string data, financial data, other types of integer data, or the like. Moreover, such processing of data may be used for different purposes, such as, for example, to identify duplicate data elements, select duplicate data elements, consolidate duplicate data elements, remove duplicate data elements, alter duplicate data elements, or for various other purposes.

Figure 1:
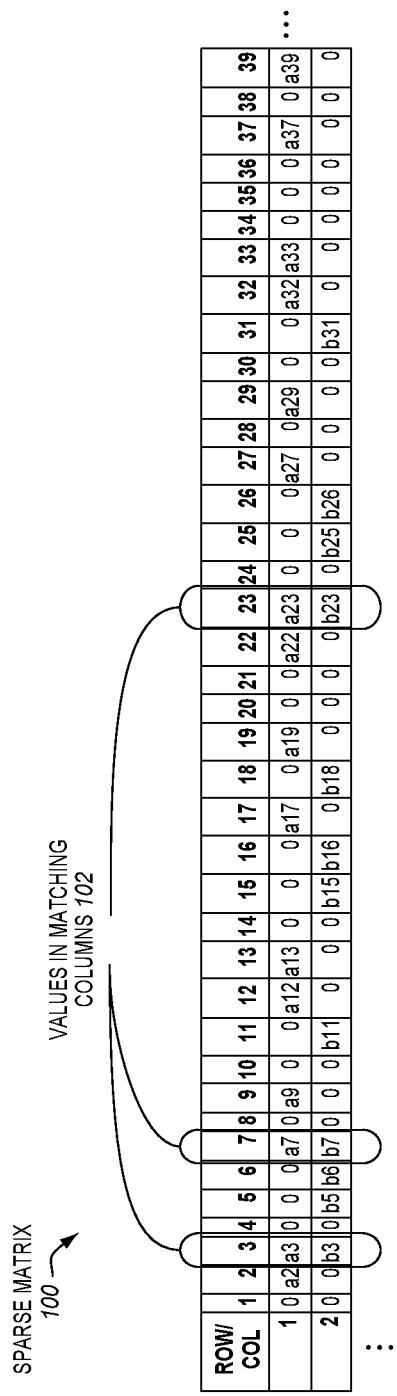
FIG. 1 is a block diagram of a portion of an example sparse matrix.

FIG. 1 is a block diagram of a portion of an example sparse matrix 100. The matrix generally represents a two-dimensional data structure in which data values are arranged into rows and columns. The data values may also be referred to herein simply as values or data elements. The illustrated example sparse matrix is shown to have at least thirty nine columns and at least two rows, and optionally more. Alternatively, other sparse matrices may have more rows and/or fewer or more columns. The values of the first row are shown as a* values, where the asterisk (*) represents the column number having the value. Similarly, the values of the second row are shown as b* values, where the asterisk (*) represents the column number having the value. For example, the value in row 1 column 7 is a7, the value in row 1 column 23 is a23, the value in row 2 column 15 is b15, and so on.

In many different applications it may be desirable to operate on two vectors, such as, for example, two rows of the sparse matrix. For example, this may be performed for sparse vector dot product calculations. Such sparse vector dot product calculations are commonly used in machine learning applications, for example. Examples of such machine learning applications are the kernelized support vector machine (SVM), the open source libSVM, kernelized principal component analysis, and the like. A frequently used kernel in such applications is the squared distance computation pattern, which is also known as the L2-norm between two vectors. The squared distance function, f, ($\|f\|$) between two vectors $\alpha$ and $\beta$ is represented by Equation 1:

$$\|\alpha-\beta\|^2 = \alpha^2 + \beta^2 - 2\alpha\cdot\beta \qquad \text{Equation 1}$$

The inner-product (●) between the two vectors $\alpha$ and $\beta$, which may be sparse vectors, is represented as a dot product calculation as shown in Equation 2:

$$\alpha\cdot\beta = \Sigma\alpha(i)*\beta(i), 0 \leq i \leq \min(\text{length}(\alpha), \text{length}(\beta)) \qquad \text{Equation 2}$$

Such sparse vector dot product calculations tend to significantly contribute to the overall computational time of machine learning and other applications. Accordingly, increasing the performance of performing such sparse vector dot product calculations may tend to help improve the performance of machine learning as well as other applications.

Referring again to FIG. 1, the sparse matrix 100 may be referred to as sparse when a significant number or proportion of the values of the matrix are zero values. Often, such zero values have special mathematical properties, such as, for example, multiplication by zero generates a product of zero, or the like. For example, in the case of multiplication of values in different rows of the same column, such zero values may generate zero valued products, whereas multiplication of two non-zero values may generate non-zero values. By way of example, multiplication of the data elements in rows 1 and 2 of column 2 (i.e., a2*0) generates a product of zero, whereas multiplication of the data elements in rows 1 and 2 of column 3 (i.e., a3*b3) generates a non-zero product. Further, in the specific case of a multiply accumulate or dot product type of calculation, often such zero values may not contribute to the overall accumulation value or dot product.

Accordingly, in these and certain other uses, it may be desired to ignore these zero values of the sparse matrix. In the sparse matrix of this particular example, as shown by reference number 102 there are only three pairs of values from rows 1 and 2 occupying a common column which both include non-zero values. Specifically, this is true for a3 and b3, for a7 and b7, and for a23 and b23. In some embodiments, it may be beneficial to be able to efficiently identify and/or isolate such pairs of values. As will be explained further below, the data element comparison instructions disclosed herein are useful for this purpose, although they are not limited to just this purpose.

Figure 2:
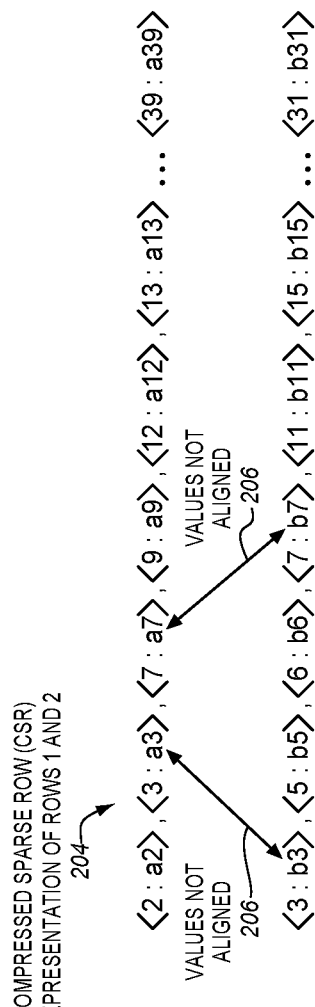
FIG. 2 illustrates a compressed sparse row representation of a subset of the columns of rows 1 and 2 of the sparse matrix of FIG. 1.

FIG. 2 illustrates a compressed sparse row (CSR) representation 204 of a subset of the columns of rows 1 and 2 of the sparse matrix of FIG. 1. In the CSR representation or format, the values of the matrix and/or a vector (e.g., a single row of the matrix) are represented by a 2-tuple or pair of an index and a corresponding value. In the case of the aforementioned sparse matrix, the index may represent the column number, for example, and the value may represent the data value for a given row in that column. These <index:value>2-tuples or pairs may be stringed together, generally in increasing index order, for all non-zero data values in a row. The end of the string may be demarcated by a sentinel value, such as, for example, a value of negative one (i.e., −1). The zero values may be omitted from, or "compressed" out of, the CSR representation. By way of example, the CSR representations for a subset of the columns of row 1, and for a subset of the columns of row 2, may be represented as follows:

<2:a2>, <3:a3>, <7:a7>, <9:a9>, <12:a12>, <13:a13>, ... <39:a39>

<3:b3>, <5:b5>, <6:b6>, <7:b7>, <11:b11>, <15:b15>, ... <31:b31>

As can be readily seen, such a CSR format omits the zero values (e.g., which may be non-contributing to a dot product or other type of operation). However one likely consequence of the CSR representation or format is that values that were in the same column of a matrix (or set of vectors), such as the data values a3 and b3, may not be in the same relative 2-tuple position and/or be "aligned", when converted into the CSR representation due in part to the removal of generally different numbers of zeroes and/or zeroes in different positions in the different vectors. This lack of alignment is shown in the illustration by reference numeral 206. For example, in the matrix of FIG. 1, the values a3 and b3 were both in column 3 and were vertically aligned, although in the CSR representations of rows 1 and 2, the tuple <3:a3> is in the second position from the left in the list of tuples (e.g., since a3 is the second non-zero value in row 1), whereas the row 2 pair <3:b3> is in the first position from the left in the list of tuples (e.g., since b3 is the first non-zero value in row 2). Similarly, the data elements a7 and b7, and a23 and b23, may also be in different relative positions in the CSR format.

One likely consequence of this, when processing data in vector, packed data, or Single Instruction, Multiple Data (SIMD) processors, is that values that were in the same column of the matrix may no longer be in the same corresponding vertically aligned data element positions of packed data operands, vectors, or SIMD operands. In some embodiments it may be desirable to operate on values in the same column (e.g., in the case of a vector multiply, etc.). This may tend to pose certain challenges with efficiently implementing operations on such values since often vector, packed data, or SIMD operations are designed to operate on corresponding vertically aligned data elements. For example, an instruction set may have a packed multiply instruction to multiply a corresponding pair of least significant data elements of a first and second source packed data operands, multiply a corresponding pair of next-to-least significant data elements of the first and second source packed data operands, and so on. Conversely, the packed multiply instruction may not be operative to multiply data elements in non-corresponding or non-vertically aligned positions.

Figure 3:
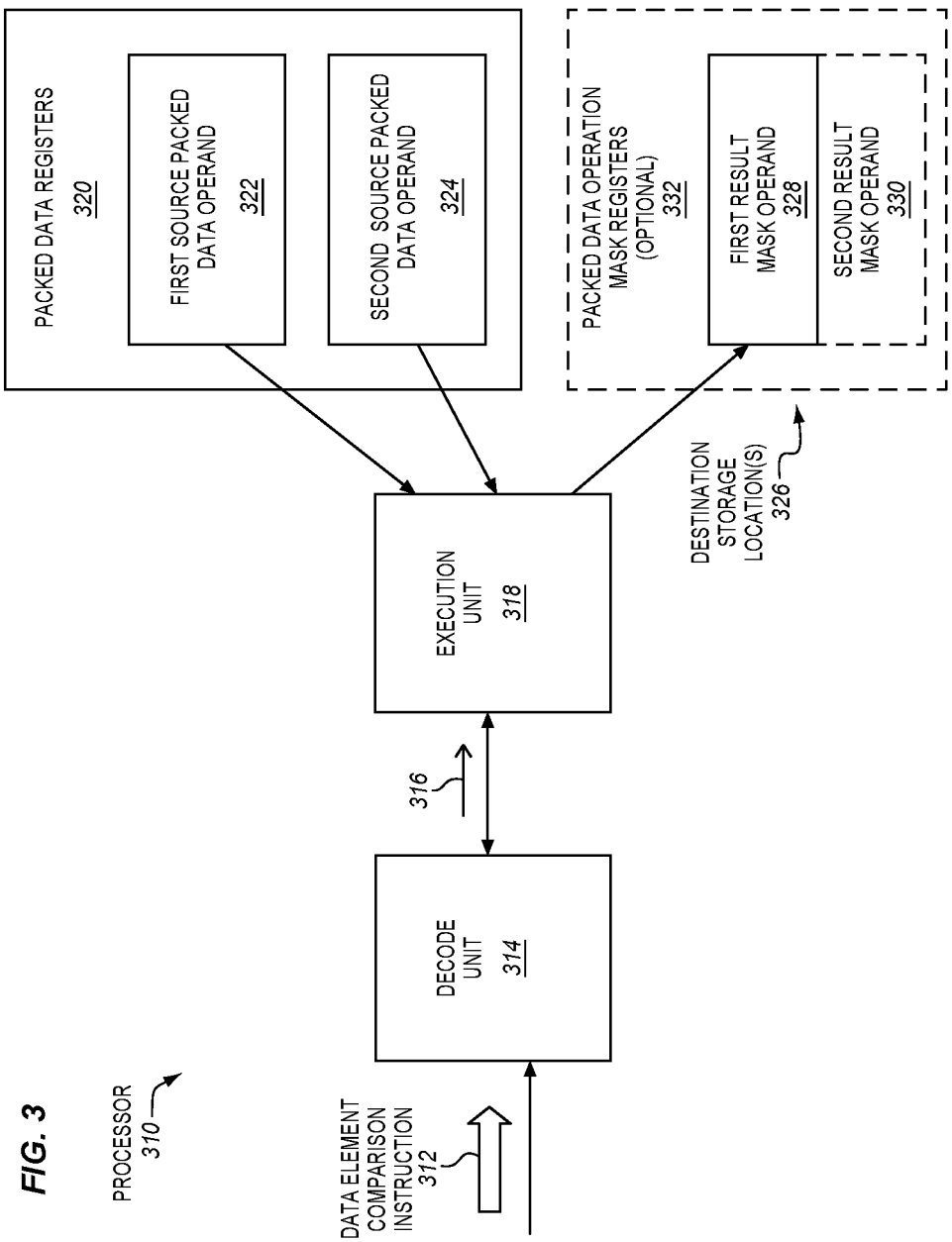
FIG. 3 is a block diagram of an embodiment of a processor that is operative to perform an embodiment of a data element comparison instruction.

FIG. 3 is a block diagram of an embodiment of a processor 310 that is operative to perform an embodiment of a data element comparison instruction 312. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor 310 may receive the data element comparison instruction 312. For example, the instruction may be received from memory on a bus or other interconnect. The instruction may represent a macroinstruction, assembly language instruction, machine code instruction, or other instruction or control signal of an instruction set of the processor. In some embodiments, the data element comparison instruction may explicitly specify (e.g., through one or more fields or a set of bits), or otherwise indicate (e.g., implicitly indicate), a first source packed data operand 322, may specify or otherwise indicate a second source packed data operand 324, and may specify or otherwise indicate at least one destination storage location 326 where a first result mask operand 328 and optionally a second result mask operand 330 are to be stored. In some embodiments, there may be at least four or at least eight data elements in each of the first and second source packed data operands. In some embodiments, the data elements may represent indices corresponding to a CSR representation, although the scope of the invention is not so limited. As one example, the instruction may have source and/or destination operand specification fields to specify registers, memory locations, or other storage locations for the operands. Alternatively, one or more of these operands may optionally be implicit to the instruction (e.g., implicit to an opcode of the instruction).

Referring again to FIG. 3, in some embodiments, the first source packed data operand 322 may optionally be stored in a first packed data register of a set of packed data registers 320, and the second source packed data operand 324 may optionally be stored in a second packed data register of the set of packed data registers 320. Alternatively, memory locations, or other storage locations, may optionally be used for one or more of these operands. Each of the packed data registers may represent an on-die storage location that is operative to store packed data, vector data, or Single instruction, multiple data (SIMD) data. The packed data registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The packed data registers may be implemented in different ways in different microarchitectures and are not limited to any particular type of design. Examples of suitable types of packed data registers include, but are not limited to, dedicated physical registers, dynamically allocated physical registers using register renaming, and combinations thereof. Specific examples of suitable packed data registers include, but are not limited to, those shown and described for FIG. 11.

Referring again to FIG. 3, in some embodiments, the processor may optionally include a set of packed data operation mask registers 332. Each of the packed data operation mask registers may represent an on-die storage location that is operative to store at least one packed data operation mask. The packed data operation mask registers may represent architecturally-visible or architectural registers that are visible to software and/or a programmer and/or are the registers indicated by instructions of the instruction set of the processor to identify operands. Examples of suitable types of packed data operation mask registers include, but are not limited to, dedicated physical registers, dynamically allocated physical registers using register renaming, and combinations thereof. Specific examples of suitable packed data operation mask registers include, but are not limited to, those shown and described for FIG. 10, and the mask or k-mask registers described at the back of the application.

As further shown, in some embodiments, the one or more destination storage locations 326 may, optionally be one or more packed data operation mask registers in the set of packed data operation mask registers 332. In some embodiments, as will be explained further below (e.g., in conjunction with FIG. 5), a first packed data operation mask register may optionally be used to store the first result mask operand 328, and a second different packed data operation mask register may optionally be used to store the second result mask operand 330. In other embodiments, as will be explained further below (e.g., in conjunction with FIG. 6), a single packed data operation mask register may optionally be used to store both the first result mask operand 328 and the second result mask operand 330. In still other embodiments, as will be explained further below (e.g., in conjunction with FIG. 8), the first result mask operand 328 and the second result mask operand 330 may instead optionally be stored in a packed data register in the set of packed data registers 320. For example, the result mask operands may be stored in a different packed data register than those used to store the first and second source packed data operands.

Alternatively, a packed data register used for either the first source packed data operand or the second source packed data operand may optionally be reused to store the first and second result mask operands. For example, the instruction may indicate a source/destination packed data register that may implicitly or impliedly be understood by the processor to be used both initially for a source packed data operand and subsequently to store the result mask operands.

Referring again to FIG. 3, the processor includes a decode unit or decoder 314. The decode unit may receive and decode the data element comparison instruction. The decode unit may output one or more relatively lower-level instructions or control signals 316 (e.g., one or more microinstructions, micro-operations, micro-code entry points, decoded instructions or control signals, etc.), which reflect, represent, and/or are derived from the relatively higher-level data element comparison instruction. In some embodiments, the decode unit may include one or more input structures (e.g., port(s), interconnect(s), an interface) to receive the data element comparison instruction, an instruction recognition and decode logic coupled therewith to recognize and decode the data element comparison instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the data element comparison instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the data element comparison instruction, which may be of a first instruction set, and may emulate, translate, morph, interpret, or otherwise convert the data element comparison instruction into one or more corresponding intermediate instructions or control signals, which may be of a second different instruction set. The one or more intermediate instructions or control signals of the second instruction set may be provided to a decode unit (e.g., decode unit 314), which may decode them into one or more lower-level instructions or control signals executable by native hardware of the processor (e.g., one or more execution units).

Referring again to FIG. 3, the execution unit 318 is coupled with the decode unit 314, the packed data registers 320, and optionally the packed data operation mask registers 332 (e.g., when the result mask operands 328, 330 are to be stored therein). The execution unit may receive the one or more decoded or otherwise converted instructions or control signals 316 that represent and/or are derived from the data element comparison instruction. The execution unit may also receive the first source packed data operand 322 and the second source packed data operand 324. The execution unit may be operative in response to and/or as a result of the data element comparison instruction (e.g., in response to the one or more instructions or control signals decoded from the instruction) to store the first result mask operand 328 and the optional second result mask operand 330 in the one or more destination storage locations 326 indicated by the instruction. In some embodiments, at least one result mask operand (e.g., the first result mask operand 328) may include a different mask element for each corresponding data element in one of the first and second source packed data operands (e.g., the first source packed data operand 322) in a same relative position within the operands. In some embodiments, each mask element may indicate whether the corresponding data element in the aforementioned one of the first and second source packed data operands (e.g., the first result mask operand 328) equals any of the data elements in the other of the first and second source packed data operands (e.g., the second result mask operand 330).

In some embodiments, the first result mask operand 328 may include a different mask element for each corresponding data element in the first source packed data operand 322 in a same relative position within the operands, and each mask element of the first result mask operand 328 may indicate whether the corresponding data element in the first source packed data operand 322 equals any of the data elements in the second source packed data operand 324. In some embodiments, the second result mask operand 330 may include a different mask element for each corresponding data element in the second source packed data operand 330 in a same relative position within the operands, and each mask element of the second result mask operand 330 may indicate whether the corresponding data element in the second source packed data operand 324 equals any of the data elements in the first source packed data operand 322. In some embodiments, each mask element may be a single mask bit. In some embodiments, the result may be any of those shown and described for FIGS. 5-8, although the scope of the invention is not so limited.

The execution unit and/or the processor may include specific or particular logic (e.g., transistors, integrated circuitry, or other hardware potentially combined with firmware (e.g., instructions stored in non-volatile memory) and/or software) that is operative to perform the data element comparison instruction and/or store the result in response to and/or as a result of the data element comparison instruction (e.g., in response to one or more instructions or control signals decoded from the data element comparison instruction). In some embodiments, the execution unit may include one or more input structures (e.g., port(s), interconnect(s), an interface) to receive source operands, circuitry or logic coupled therewith to receive and process the source operands and generate the result operands, and one or more output structures (e.g., port(s), interconnect(s), an interface) coupled therewith to output the result operands. In some embodiments, the execution unit may optionally include comparison circuitry or logic coupled with the data elements of the source operands by a fully connected crossbar where each data element in the first source packed data operand may be compared with each data element in the second source packed data operand so that an all element to all element comparison may be performed. For example, if there are integer N elements in the first source packed data operand and integer M elements in the second source packed data operand, then N*M comparisons may be performed, in some embodiments.

To avoid obscuring the description, a relatively simple processor 310 has been shown and described. However, the processor may optionally include other processor components. For example, various different embodiments may include various different combinations and configurations of the components shown and described for any of FIGS.

15-18. All of the components of the processor may be coupled together to allow them to operate as intended.

Figure 4:
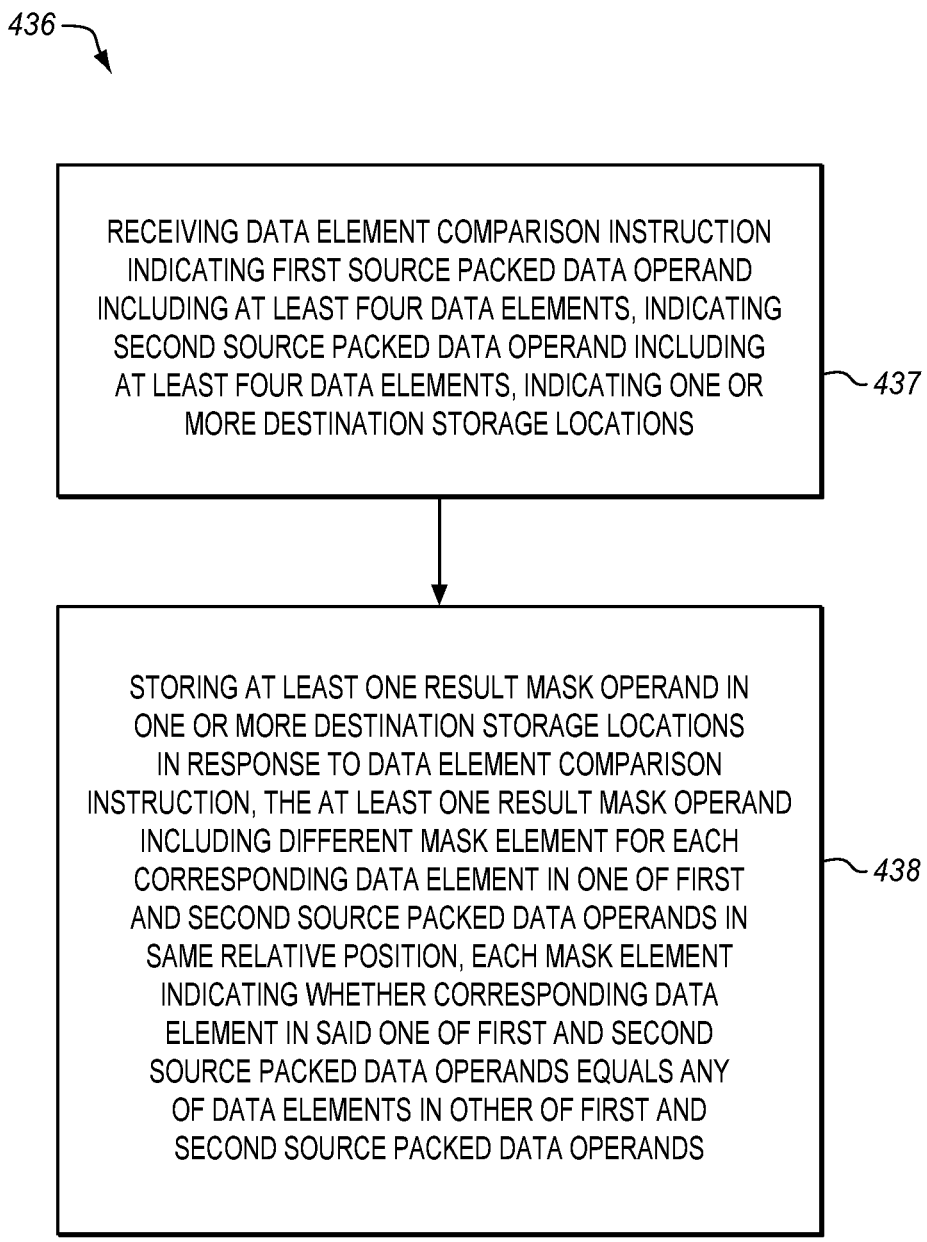
FIG. 4 is a block flow diagram of an embodiment of a method of performing an embodiment of a data element comparison instruction.

FIG. 4 is a block flow diagram of an embodiment of a method 436 of performing an embodiment of a data element comparison instruction. In various embodiments, the method may be performed by a processor, instruction processing apparatus, or other digital logic device. In some embodiments, the method 436 may be performed by and/or within the processor 310 of FIG. 3. The components, features, and specific optional details described herein for the processor 310, also optionally apply to the method 436. Alternatively, the method 436 may be performed by and/or within a similar or different processor or apparatus. Moreover, the processor 310 may perform methods that are similar to or different than the method 436.

The method includes receiving the data element comparison instruction, at block 437. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The data element comparison instruction may specify or otherwise indicate a first source packed data operand including at least four data elements, or in some cases at least eight or more data elements, indicate a second source packed data operand including at least four data elements, or in some cases at least eight or more data elements, and indicate one or more destination storage locations. In some embodiments, the data elements may represent indices corresponding to a CSR representation, although the scope of the invention is not so limited.

At least one result mask operand may be stored in the one or more destination storage locations in response to and/or as a result of the data element comparison instruction, at block 438. The at least one result mask operand may include a different mask element for each corresponding data element in one of the first and second source packed data operands in a same relative position within the operands. Each mask element may indicate whether the corresponding data element in the aforementioned one of the first and second source packed data operands equals any of the data elements in the other of the first and second source packed data operands. In some embodiments, at least two result mask operands are stored. In some embodiments, the two result mask operands may be stored in a single mask register. In other embodiments, the two result mask operands may be stored in two different mask registers. In still other embodiments, the two result mask operands may be stored in a packed data operand, such as, for example, by storing a bit of each of the first and second result mask operands in each data element of the packed data operand.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc. In some embodiments, the microarchitectural operations to implement the instruction may optionally include comparing each data element of the first source packed data operand with each data element of the second source packed data operand. In some embodiments, a crossbar based hardware comparison logic may be used to perform these comparisons.

In some embodiments, the method may optionally be performed during or as part of an algorithm to accelerate sparse vector-sparse vector arithmetic (e.g., a sparse vector-sparse vector dot product calculation), although the scope of the invention is not so limited. In some embodiments, the result mask operands stored in response to the instruction may be used to consolidate or collect together data elements that the result mask operands indicate are matching in the source packed data operands. For example, in some embodiments, the result mask operands may be indicated as a source operand of, and used by, a masked data element consolidation instruction. In other embodiments, the result mask operand(s) may be minimally processed and then resulting result mask operand(s) may be indicated as source operand(s) of, and used by, masked data element consolidation instruction(s).

Figure 5:
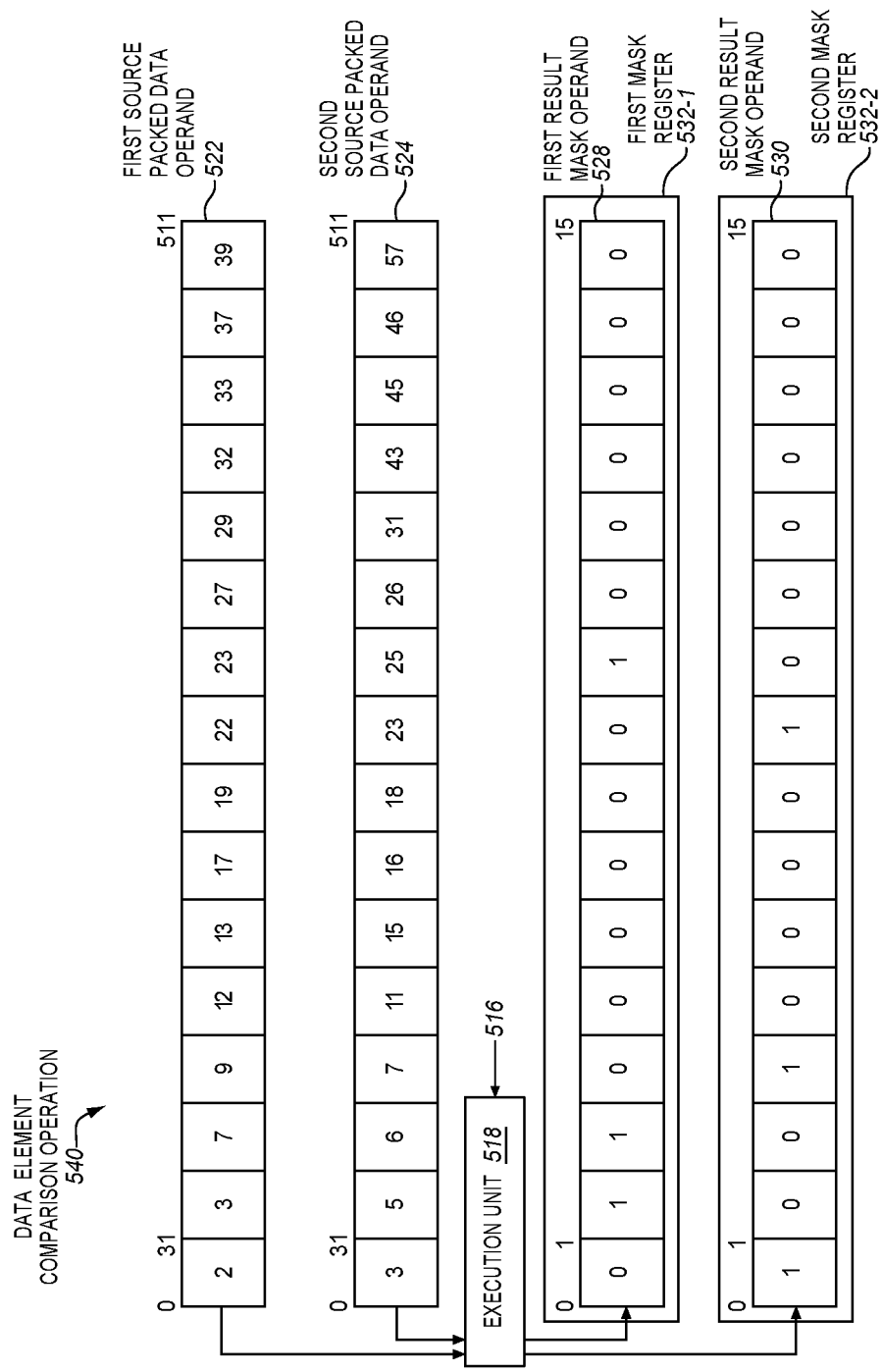
FIG. 5 is a block diagram of a first example embodiment of a data element comparison operation.

FIG. 5 is a block diagram illustrating a first example embodiment of a data element comparison operation 540 that may be performed in response to a first example embodiment of a data element comparison instruction. The instruction may specify or otherwise indicate a first source packed data operand 522, and may specify or otherwise indicate a second source packed data operand 524. These source operands may be stored in packed data registers, memory locations, or other storage locations, as previously described.

In the illustrated embodiment, each of the first and second source packed data operands is a 512-bit operand having sixteen 32-bit data elements, although other sized operands, other sized data elements, and other numbers of data elements, may optionally be used in other embodiments. Commonly, the number of data elements in each source packed data operand may be equal to the size in bits of the source packed data operand divided by the size in bits of a single data element. In various embodiments, the sizes of each of the source packed data operands may be 64-bits, 128-bits, 256-bits, 512-bits, or 1024-bits, although the scope of the invention is not so limited. In various embodiments, the size of each data element may be 8-bits, 16-bits, 32-bits, or 64-bits, although the scope of the invention is not so limited. Other packed data operand sizes and data elements sizes are also suitable. In various embodiments, there may be at least four, at least eight, at least sixteen, at least thirty-two, or more than thirty-two data elements (e.g., at least sixty four), in each of the source packed data operands. Often, the number of data elements in each of the first and second source packed data operands may be the same, although this is not required.

To further illustrate, a few illustrative examples of suitable alternate formats will be mentioned, although the scope of the invention is not limited to just these formats. A first example format is a 128-bit packed byte format that includes sixteen 8-bit data elements. A second example format is a 128-bit packed word format that includes eight 16-bit data elements. A third example format is a 256-bit packed byte format that includes thirty-two 8-bit data elements. A fourth example format is a 256-bit packed word format that includes sixteen 16-bit data elements. A fifth example format is a 256-bit packed doubleword format that includes eight 32-bit data elements. A sixth example format is a 512-bit packed word format that includes thirty-two 16-bit data elements. A seventh example format is a 512-bit packed doubleword format that includes sixteen 32-bit data elements. An eighth example format is a 512-bit packed quadword format that includes eight 64-bit data elements.

As shown, in some embodiments, in response to the instruction and/or operation, a first result mask operand 528 may be generated and stored in a first mask register 532-1 indicated by the instruction, and a second result mask operand 530 may be generated and stored in a second mask register 532-2 indicated by the instruction. In some embodiments, the first and second source packed data operands 522, 524 may be input to an execution unit 518. The execution unit, responsive to the instruction (e.g., as controlled by one or more instructions or control signals 516 decoded from the instruction), may generate and store the result mask operands. In some embodiments, this may include the execution unit comparing each data element in the first source packed data operand with each data element in the second source packed data operand. For example, each of the sixteen data elements in the first source packed data operand may be compared with each of the sixteen data elements in the second source packed data operand for a total of two hundred and fifty six comparisons.

Each result mask operand may correspond to a different one of the source packed data operands. For example, in the illustrated embodiment, the first result mask operand may correspond to the first source packed data operand, and the second result mask operand may correspond to the second source packed data operand. In some embodiments, each result mask operand may have the same number of mask elements as the number of data elements in the corresponding source packed data operand. In the illustrated embodiments, each of the mask elements is a single bit. As shown, the first result mask operand may have sixteen 1-bit mask elements each corresponding to a different one of the sixteen data elements of the first source packed data operand in a same relative position within the operands, and the second result mask operand may have sixteen 1-bit mask elements each corresponding to a different one of the sixteen data elements of the second source packed data operand in a same relative position within the operands. In the case of other numbers of data elements in other embodiments, if a first source packed data operand has N data elements, and a second source packed data operand has M data elements, then N*M comparisons may be performed, and a first N-bit result mask corresponding to the first source packed data operand may be stored, and a second M-bit result mask corresponding to the second source packed data operand may be stored.

In some embodiments, each mask element may have a value (e.g., in this case a bit value) to indicate whether or not its corresponding source data element (e.g., in the same relative position) in its corresponding source packed data operand matched any of the source data elements in the other non-corresponding source packed data operand. For example, each bit in the first result mask operand may have a bit value to indicate whether or not its corresponding data element (e.g., in the same relative position) in the first source packed data operand matched any of the data elements in the second source packed data operand, whereas each bit in the second result mask operand may have a bit value to indicate whether or not its corresponding data element (e.g., in the same relative position) in the second source packed data operand matched any of the data elements in the first source packed data operand. According to one possible convention which is used in the illustrated embodiment, each mask bit that is set to binary one (i.e., 1) may indicate that its corresponding data element in its corresponding source packed data operand matches or equals at least one data element in the other non-corresponding source packed data operand. In contrast, each mask bit that is cleared to binary zero (i.e., 0) may indicate that its corresponding data element in its corresponding source packed data operand does not match or equal any of the data elements in the other non-corresponding source packed data operand. The opposite convention is also suitable for other embodiments.

For example, in the particular illustrated example embodiment the only data elements in the first source packed data operand that match or equal data elements in the second source packed data operand are those with the values of 3, 7, and 23. Considering the first source packed data operand, the data element of value 3 is the second data element position from the left or least significant bit, the data element of value 7 is the third data element position from the left or least significant bit, and the data element of value 23 is the tenth data element position from the left or least significant bit. Correspondingly, in the first result mask operand, only the second, third, and tenth mask bits from the left or least significant end are set to binary one (i.e., 1) to indicate that the corresponding data elements in the first source packed data operand match at least one data element in the second source packed data operand, whereas all others bits are cleared to binary zero (i.e., 0) to indicate the corresponding data elements in the first source packed data operand do not match any data elements in the second source packed data operand.

Likewise, considering the second source packed data operand, the data element of value 3 is the first data element position from the left or least significant bit, the data element of value 7 is the fourth data element position from the left or least significant bit, and the data element of value 23 is the ninth data element position from the left or least significant bit. Correspondingly, in the second result mask operand, only the first, fourth, and ninth mask bits from the left or least significant end are set to binary one (i.e., 1) to indicate that the corresponding data elements in the second source packed data operand match at least one data element in the first source packed data operand, whereas all others bits are cleared to binary zero (i.e., 0) to indicate the corresponding data elements in the second source packed data operand do not match any data elements in the first source packed data operand.

In some embodiments, the first and second mask registers may represent registers of a set of architectural registers of a processor that are to be used by masked packed data instructions of an instruction set of the processor to perform packed data operation masking, predication, or conditional control. For example, in some embodiments, the first and second mask registers may be registers in the set of packed data operation mask registers 322 of FIG. 3. The masked packed data instructions may be operative to indicate (e.g., have a field to indicate) the mask registers as source operands to be used to mask, predicate, or conditionally control a packed data operation. In some embodiments, the masking, predication, or conditional control may be provided at per-data element granularity so that operations on different data elements, or pairs of corresponding data elements, may be masked, predicated, or conditionally controlled separately and/or independently of the others. For example, each mask bit may have a first value to allow the operation to be performed and allow the corresponding result data element to be stored in the destination, or may have a second different value to not allow the operation to be performed and/or not allow the corresponding result data element to be stored in the destination. According to one possible convention, a mask bit cleared to binary zero (i.e., 0) may represent a masked out operation for which a corresponding operation isn't to be performed and/or a corresponding result isn't to be stored, whereas a mask bit set to binary one (i.e., 1) may represent an unmasked operation for which a corresponding operation is to be performed and a corresponding result is to be stored. The opposite convention is also possible.

In the embodiment illustrated in FIG. 5, the first and second result mask operands are stored in different mask registers (e.g., different packed data operation mask registers). One possible advantage, for some embodiments, is that each result mask operand and/or mask register may be directly suitable for use as a source packed data operation mask operand for a masked or predicated packed data instruction, such as a masked or predicated data element consolidation instruction (such as, for example, a VPCOMPRESS instruction), although the scope of the invention is not limited to such a use. By way of example, two instances of the masked or predicated data element consolidation instruction may each use a different one of the first and second result mask operands, substantially without any additional processing of the first and second result mask operands being needed, as a source mask, predicate, or conditional control operand for a data element consolidation operation. For example, the unmasked bits or mask elements of the result masks or mask registers may correspond to matching indices of CSR tuples that were compared and the masked or predicated data element consolidation instruction may use these unmasked bits or mask elements to consolidate together the corresponding values of these CSR tuples. Further details of how such masked or predicated data element consolidation instructions may be used in this way will be discussed further below.

Figure 6:
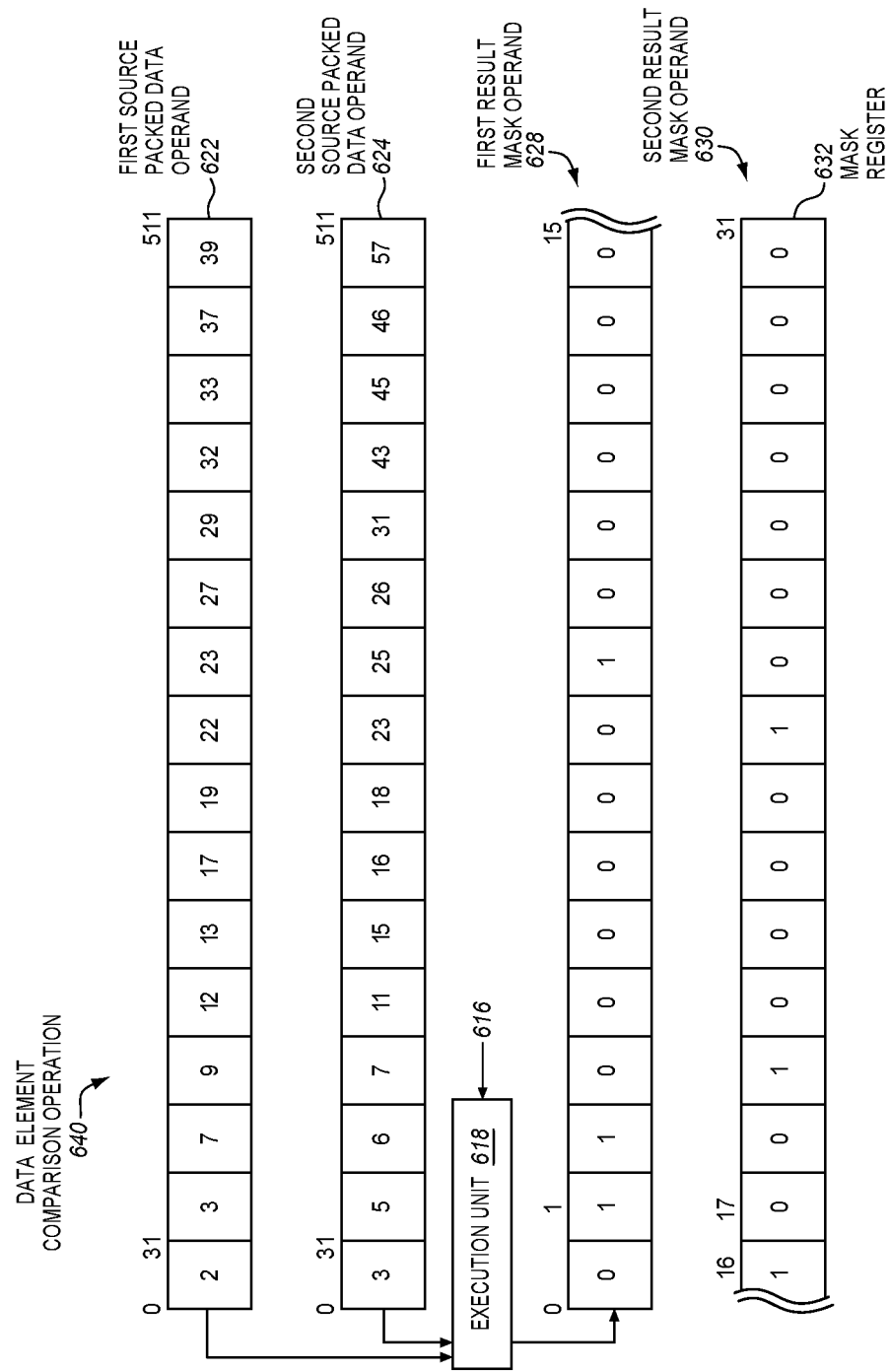
FIG. 6 is a block diagram of a second example embodiment of a data element comparison operation.

FIG. 6 is a block diagram illustrating a second example embodiment of a data element comparison operation 640 that may be performed in response to a second example embodiment of a data element comparison instruction. The operation 640 has certain similarities to the operation 540 of FIG. 5. To avoid obscuring the description, the different and/or additional characteristics for the operation 640 will primarily be described, without repeating all the optionally similar or common characteristics and details relative to the operation 540. However, it is to be appreciated that the previously described characteristics and details of the operation 540, including the variations and alternate embodiments thereof, may also optionally apply to the operation 640, unless stated otherwise or otherwise clearly apparent.

As in the embodiment of FIG. 6, the instruction may specify or otherwise indicate a first source packed data operand 622, and may specify or otherwise indicate a second source packed data operand 624. The first and second source packed data operands may be input to an execution unit 618. The execution unit, responsive to the instruction (e.g., as controlled by one or more instructions or control signals 616 decoded from the instruction), may generate and store a first result mask operand 628 and a second result mask operand 630.

One difference of the embodiment of FIG. 6, relative to the embodiment of FIG. 5, is that the first and second result mask operands are stored in a single mask register 632, instead of each being stored in a different mask register (e.g., the first mask register 532-1 and the second mask register 532-2). Specifically, the first result mask operand 628 is stored in a least significant 16-bits of the single mask register, and the second result mask operand 630 is stored in a next adjacent 16-bits of the single mask register. Alternatively, the positions of the first and second mask operands may optionally be swapped. In this case, a least significant portion of the single mask register (e.g., the least significant 16-bits) corresponds to one of the source packed data operands (e.g., in this case the first source packed data operand), and a more significant portion of the single mask register (e.g., the next more significant 16-bits) corresponds to another one of the source packed data operands (e.g., in this case the second source packed data operand). In the illustration, the mask register is shown as having only 32-bits, although in other embodiments it may have fewer or more, such as, for example, 64-bits.

In some embodiments, the least significant first result mask operand may be directly suitable for use as a source packed data operation mask operand for a masked packed data instruction, such as a masked or predicated data element consolidation instruction (e.g., such as, for example, a VPCOMPRESS instruction), although the scope of the invention is not limited to such a use. Moreover, a simple shift may be used to shift bits [16:31] of the mask register into bits [0:15] so that the second result mask operand may be directly suitable for use as a source packed data operation mask operand for a masked packed data instruction, such as a masked or predicated data element consolidation instruction (e.g., such as, for example, a VPCOMPRESS instruction), although the scope of the invention is not limited to such a use.

Figure 7:
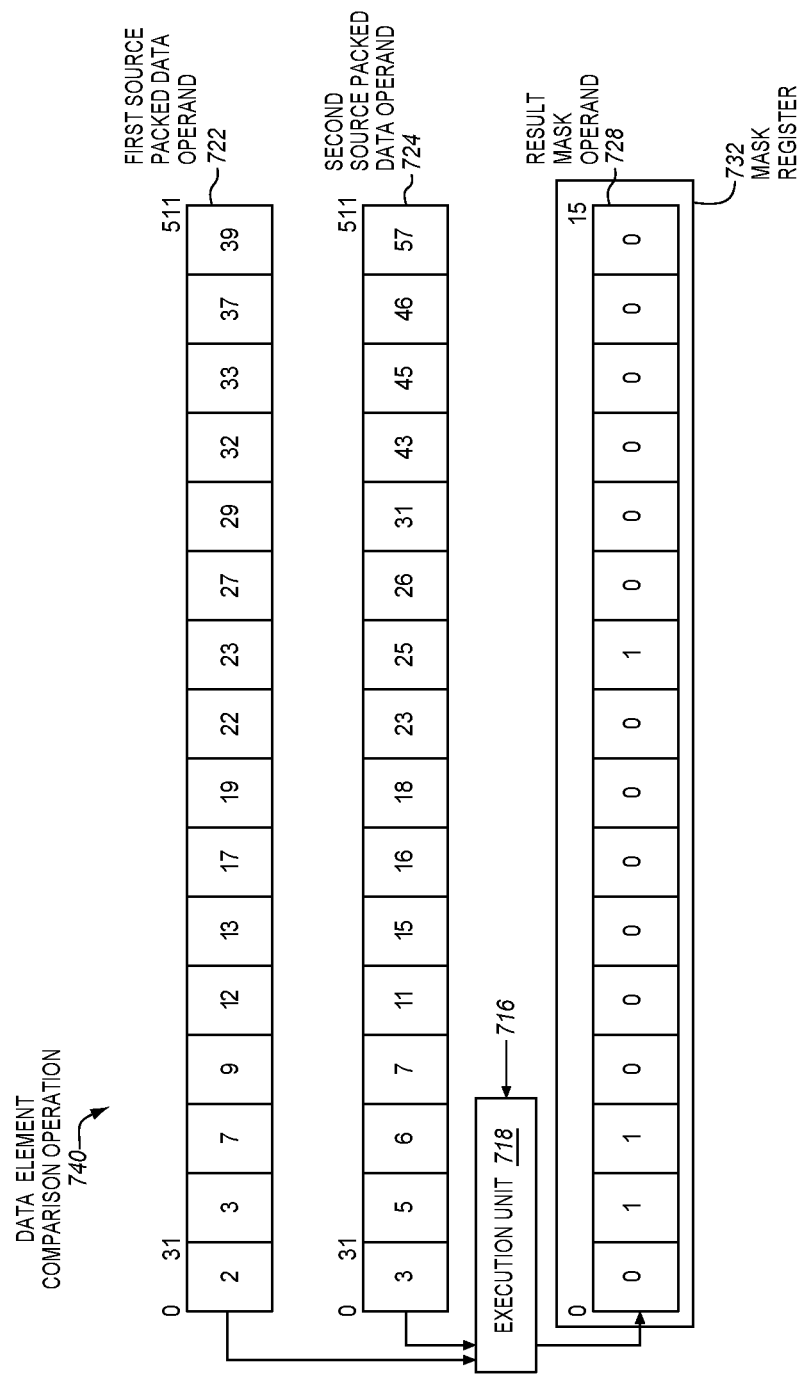
FIG. 7 is a block diagram of a third example embodiment of a data element comparison operation.

FIG. 7 is a block diagram illustrating a third example embodiment of a data element comparison operation 740 that may be performed in response to a third example embodiment of a data element comparison instruction. The operation 740 has certain similarities to the operation 540 of FIG. 5. To avoid obscuring the description, the different and/or additional characteristics for the operation 740 will primarily be described, without repeating all the optionally similar or common characteristics and details relative to the operation 540. However, it is to be appreciated that the previously described characteristics and details of the operation 540, including the variations and alternate embodiments thereof, may also optionally apply to the operation 740, unless stated otherwise or otherwise clearly apparent.

As in the embodiment of FIG. 7, the instruction may specify or otherwise indicate a first source packed data operand 722, and may specify or otherwise indicate a second source packed data operand 724. The first and second source packed data operands may be input to an execution unit 718. The execution unit, responsive to the instruction (e.g., as controlled by one or more instructions or control signals 716 decoded from the instruction), may generate and store a result.

One difference of the embodiment of FIG. 7, relative to the embodiment of FIG. 5, is that the execution unit 718 may only generate and store a single result mask operand 728. In some embodiments, the single result mask operand may be stored in a mask register (e.g., a packed data operation mask register). In some embodiments, the single result mask operand may correspond to one of the first and second source packed data operands (e.g., in the illustrated example the first source packed data operand). In some embodiments, the result mask operand 728 and/or mask register 732 may be directly suitable for use as a source packed data operation mask operand for a masked packed data instruction, such as a masked or predicated data element consolidation instruction (e.g., such as, for example, a VPCOMPRESS instruction), although the scope of the invention is not limited to such a use. A different instance of the instruction (with the same opcode) may be performed again to generate the result mask operand for the other source packed data operand.

Figure 8:
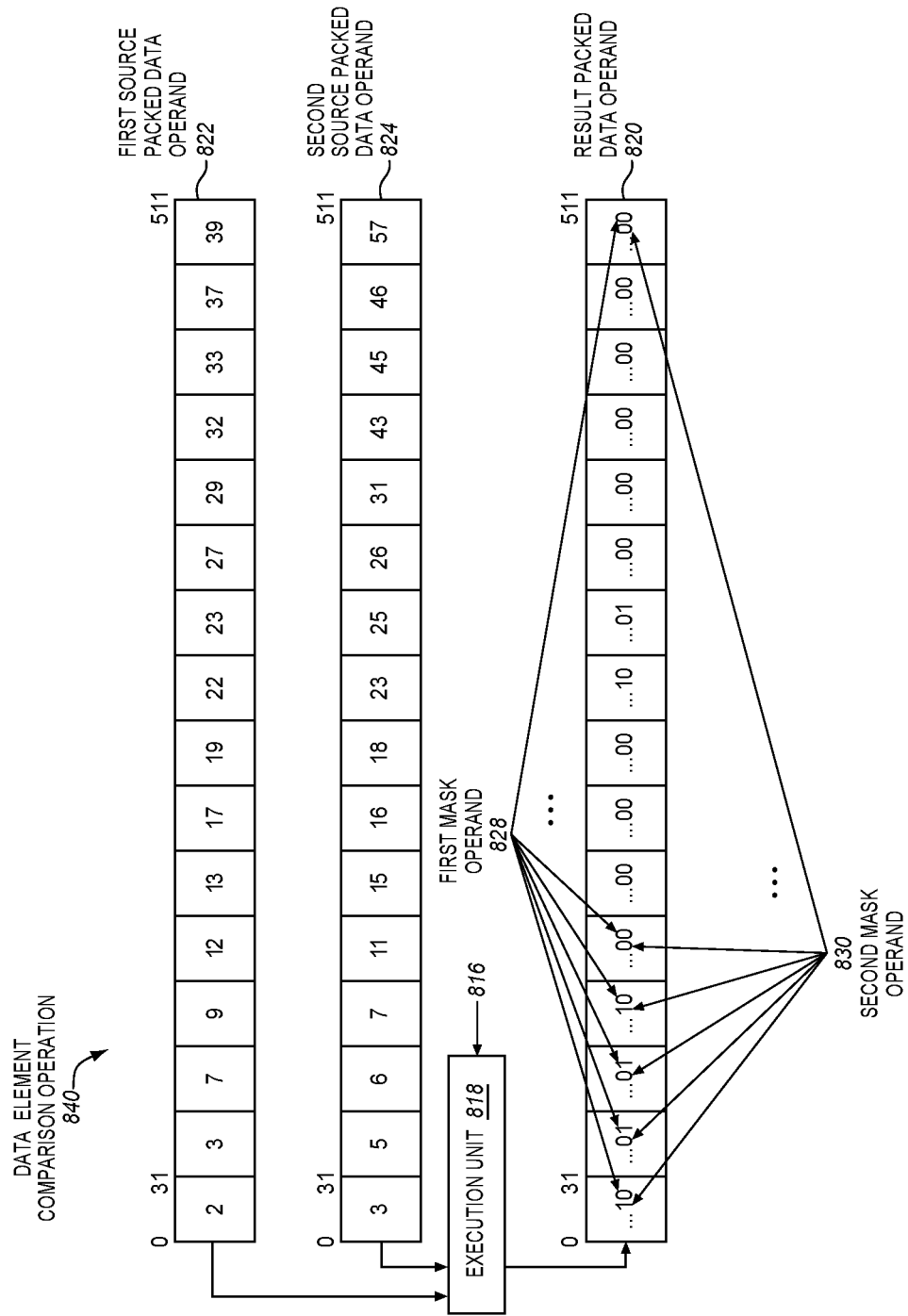
FIG. 8 is a block diagram of a fourth example embodiment of a data element comparison operation.

FIG. 8 is a block diagram illustrating a fourth example embodiment of a data element comparison operation 840 that may be performed in response to a fourth example embodiment of a data element comparison instruction. The operation 840 has certain similarities to the operation 540 of FIG. 5. To avoid obscuring the description, the different and/or additional characteristics for the operation 840 will primarily be described, without repeating all the optionally similar or common characteristics and details relative to the operation 540. However, it is to be appreciated that the previously described characteristics and details of the operation 540, including the variations and alternate embodiments thereof, may also optionally apply to the operation 840, unless stated otherwise or otherwise clearly apparent.

As in the embodiment of FIG. 8, the instruction may specify or otherwise indicate a first source packed data operand 822, and may specify or otherwise indicate a second source packed data operand 824. The first and second source packed data operands may be input to an execution unit 818. The execution unit, responsive to the instruction (e.g., as controlled by one or more instructions or control signals 816 decoded from the instruction), may generate and store a first result mask operand 828 and a second result mask operand 830.

One difference of the embodiment of FIG. 8, relative to the embodiment of FIG. 5, is that the execution unit 818 may generate and store the first and second result mask operands 828, 830 in a result packed data operand 820. For example, the result packed data operand may be stored in a packed data register, memory location, or other storage location. In one embodiments, the result packed data operand or register may be a 512-bit operand or register, although the scope of the invention is not so limited. Another difference is that the mask bits of the first and second result mask operands may be disposed within other non-mask bits. As shown, there may be two bits in each result data element in the result packed data operand used as mask bits. One of these two bits in each data element may be used for the first result mask operand, whereas the other may be used for the second result mask operand. For example, the two least significant bits of each data element may optionally be used, the two most significant bits of each data element may optionally be used, the least significant and the most significant bits may optionally be used, or some other set of bits may optionally be used. In the illustrated embodiment, the two least significant bits are used, and the least significant bit of the two is used for the first mask operand while the more significant bit of the two is used for the second mask operand, although this is not required.

The following pseudocode represents one example embodiment of a data element comparison instruction named VXBARCMPU:

```
VXBARCMPU{Q|DQ} VDEST, SRC1, SRC2
//Instruction generates 2 masks for n indices in each of SRC1 and SRC2
//VDEST, SRC1, and SRC2 are each a packed data register
VDEST = 0 ; // initialize, VDEST holds the final 2bit masks
for i ← 1 to n // n=16 (Q) or 8 (DQ)
    for j ← 1 to n // n=16 (Q) or 8 (DQ)
        bool match = (SRC1.element[i] == SRC2.element[j]) ? 1:0
        //n^2 comparisons
        VDEST.element[i].bit[0] = VDEST.element[i].bit[0] | match;
        //bit0
        VDEST.element[j].bit[1] = VDEST.element[j].bit[1] | match;
        //bit1
```

In this pseudocode, Q represents a 32-bit quadword, whereas DQ represents a 64-bit double quadword. The symbol "|" represents logical OR. The term "match" represents comparison for equality, for example, of integers.

Now, in the embodiments of FIGS. 5-8, each of the bits in the result mask operand provides a summary or cumulative indication of whether or not its corresponding source data element matched any of the source data elements in the other non-corresponding operand. Also, in the embodiments of FIGS. 5-8, each result mask operand has the same number of mask bits as the number of data elements in its corresponding source operand. As such, these mask bits are in a format that is generally well suited for use as a mask operand for a masked packed data instruction, such as a masked or predicated data element consolidation instruction (e.g., a masked VPCOMPRESS instruction).

An alternate possible approach would be to store a number of per-comparison bits equal in number to the number of comparisons made. Each of these bits alone would not provide a summary or cumulative indication of whether or not its corresponding source data element matched any of the source data elements in the other non-corresponding operand. Rather, each of these per-comparison bits would correspond to a single comparison performed between a different combination of a data element of the first source packed data operand and a data element of the second source packed data operand. For example, in the case of two source packed data operands each having N data elements, N*N comparisons may be performed, and N*N result mask bits may be stored using this alternate approach. For example, in the case of two sixteen data element operands, two hundred and fifty six may be performed, and a 256-bit result mask may be stored, instead of just two 16-bit result masks.

However, one potential drawback with such an alternate approach is that the result mask operand may tend to be in a less useful and/or efficient format for certain types of subsequent operations. For example, no single such per-comparison bit indicates whether or not a data element in one source has a matching data element in the other source, without further processing. As such, these per-comparison result mask bits may not, without further processing, be as well suited for use as a mask operand for a masked packed data instruction, such as a masked or predicated data element consolidation instruction (e.g., a masked VPCOMPRESS instruction). In addition, the additional bits provided for all comparison results may tend to take up more interconnect bandwidth, register space, power, etc.

In contrast, each of the first and second result mask operands 528, 530 and/or first and second mask registers 532-1, 532-2 may be directly useable as a source mask by a masked packed data instruction (e.g., a masked VPCOMPRESS instruction). Likewise, the first result mask operand 628 may be directly useable as a source mask by a masked packed data instruction (e.g., a masked VPCOMPRESS instruction), and the second result mask operand 630 may be easily made directly useable (e.g., by a simple 16-bit shift). Likewise, the result mask operand 728 and/or mask register 732 may be directly useable as a source mask by a masked packed data instruction (e.g., a masked VPCOMPRESS instruction).

In any of the embodiments shown in FIGS. 3-8, in some embodiments, if it is fixed for the instruction (e.g., fixed or implicit to an opcode of the instruction), or can be otherwise assured, that the data elements of the source operands are each arranged in ascending order (e.g., as may be the case when working with indices of CSR format data or when working with certain other types of data), certain comparisons may optionally be avoided. For example, comparisons may be avoided when it can be readily determined that none of the elements in the source packed data operands would match. By way of example, logic may be included to test if either the least significant data element in the first source packed data operand is greater than the most significant data element in the second source packed data operand or the most significant data element in the first source packed data operand is less than the least significant data element in the second source packed data operand and if either of these is true to avoid comparing each data element of one source with each data element of the other source. On the one hand this may help to reduce power consumption, but is optional not required.

Figure 9:
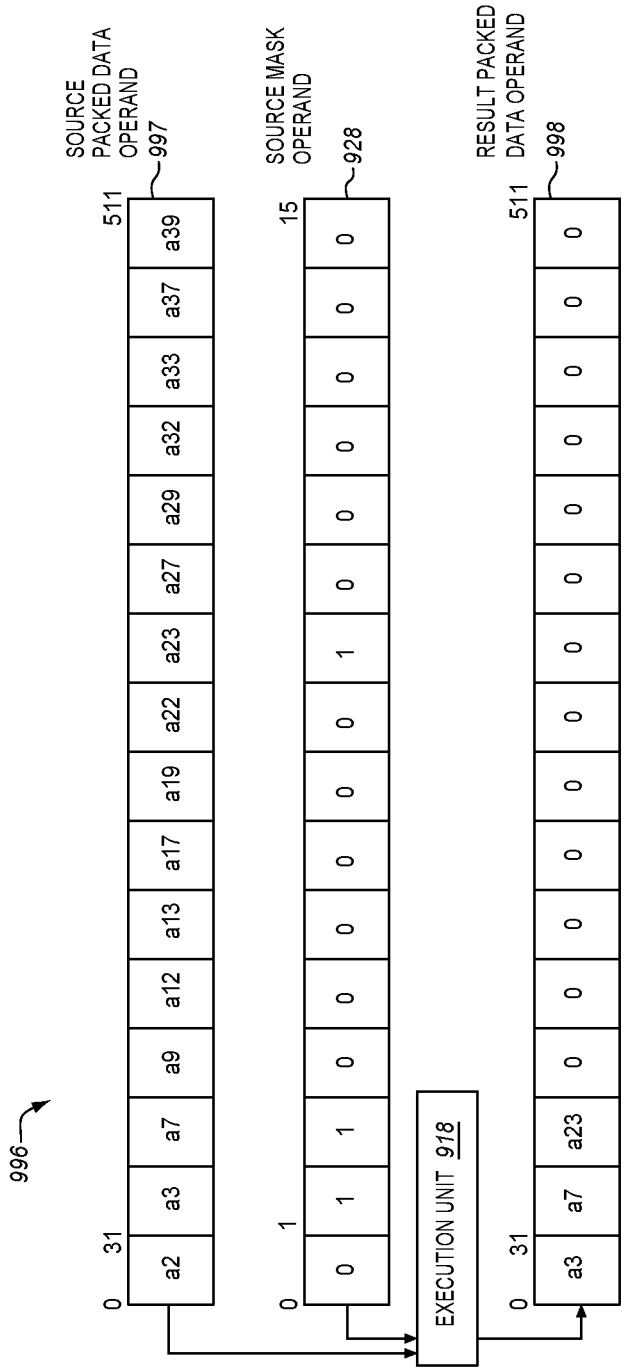
FIG. 9 is a block diagram of an example of a masked data element consolidate operation.

FIG. 9 is a block diagram of an example of a masked data element consolidate operation 996 that may be performed in response to a masked data element consolidate instruction. One example of such an instruction suitable for embodiments is a VPCOMRESSD instruction in x86, although the use of this instruction is not required.

The masked data element consolidate instruction may indicate a source packed data operand 997. In some embodiments, the source packed data operand may store data values that correspond to indices of a CSR format. For example, the source packed data operand may store data values that correspond to indices of one of the first source packed data operands 522, 622, 722, or 822. With reference again to the sparse matrix of FIG. 1, the data value a3 corresponds to the index 3 of column 3, the data value a7 corresponds to the index 7 of column 7, and so on.

The masked data element consolidate instruction may also indicate a source mask operands 928. In various embodiments, the source mask operand may be the first result mask operand 528, the first result mask operand 628, or the result mask operand 728. Alternatively, the result packed data operand 820 may be minimally processed to generate the source mask operand 928.

The source packed data operand 997 and the source mask operand 928 may be provided to an execution unit 918. The execution unit may be operative in response to the instruction and/or operation to store the result packed data operand 998. In some embodiments, the instruction/operation may cause the execution unit to contiguously store active data elements in the source packed data operand 997, which correspond to mask bits of the source mask operand 928 in same relative positions that are set to binary one, to least significant data element positions of the result packed data operand. All remaining data elements of the result packed data operand may be cleared to zero. As shown, the three values a3, a7, and a23 of the source packed data operand, which are the only three active values with corresponding set mask bits, may be consolidated together in the three least significant data element positions of the result packed data operand, with all more significant result data elements zeroed. In this case, the VPCOMRESSD instruction uses zeroing masking in which masked result data elements are zeroed.

Another instances of a masked data element consolidation instruction may similarly be performed to consolidate together the matching values b3, b7, and b23 in the three least significant data element positions of another result packed data operand. For example, the second result mask operand 530 may be used along with the corresponding values from the CSR representation of row 2 of the sparse matrix 100. By this approach, the matching or equaling data values of data represented in a CSR format may be isolated, consolidated, and put into vertical SIMD alignment in same relative positions in packed data operands. Such operations may be repeated until the vectors or rows of the sparse matrix end reach their ends. This may help to allow efficient vertical SIMD processing of these matching data values. Advantageously, in one aspect, this may be used to help improve the performance of sparse vector-sparse vector arithmetic operations.

Figure 10:
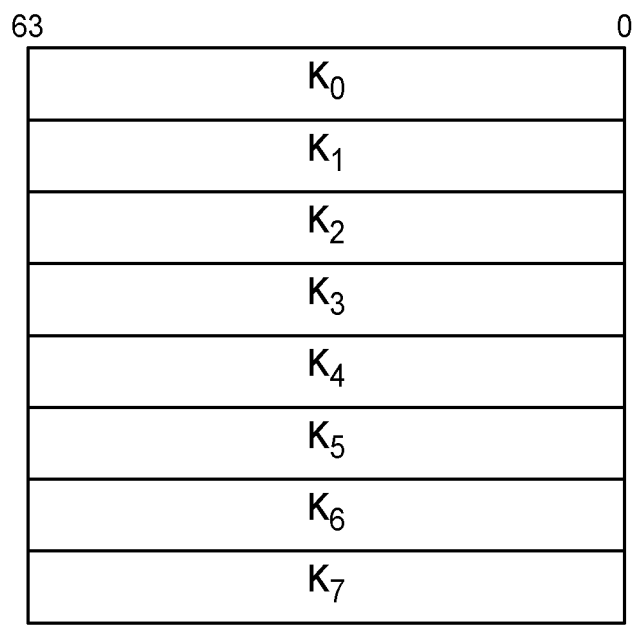
FIG. 10 is a block diagram of an example embodiment of a suitable set of packed data operation mask registers.

FIG. 10 is a block diagram of an example embodiment of a suitable set of packed data operation mask registers 1032. In the illustrated embodiment, the set includes eight registers labeled k0 through k7. Alternate embodiments may include either fewer than eight registers (e.g., two, four, six, etc.), or more than eight registers (e.g., sixteen, thirty-two, etc.). Each of these registers may be used to store a packed data operation mask. In the illustrated embodiment, each of the registers is 64-bits. In alternate embodiments, the widths of the registers may be either wider than 64-bits (e.g., 80-bits, 128-bits, etc.), or narrower than 64-bits (e.g., 8-bits, 16-bits, 32-bits, etc.). The registers may be implemented in different ways and are not limited to any particular type of circuit or design. Examples of suitable registers include, but are not limited to, dedicated physical registers, dynamically allocated physical registers using register renaming, and combinations thereof.

In some embodiments, the packed data operation mask registers 1032 may be a separate, dedicated set of architectural registers. In some embodiments, the instructions may encode or specify the packed data operation mask registers in different bits or one or more different fields of an instruction format than those used to encode or specify other types of registers (e.g., packed data registers). By way of example, an instruction may use three bits (e.g., a 3-bit field) to encode or specify any one of the eight packed data operation mask registers k0 through k7. In alternate embodiments, either fewer or more bits may be used, respectively, when there are fewer or more packed data operation mask registers. In one particular implementation, only packed data operation mask registers k1 through k7 (but not k0) may be addressed as a predicate operand to predicate a masked packed data operation. The register k0 may be used as a regular source or destination, but may not be encoded as a predicate operand (e.g., if k0 is specified it has a "no mask" encoding), although this is not required.

Figure 11:
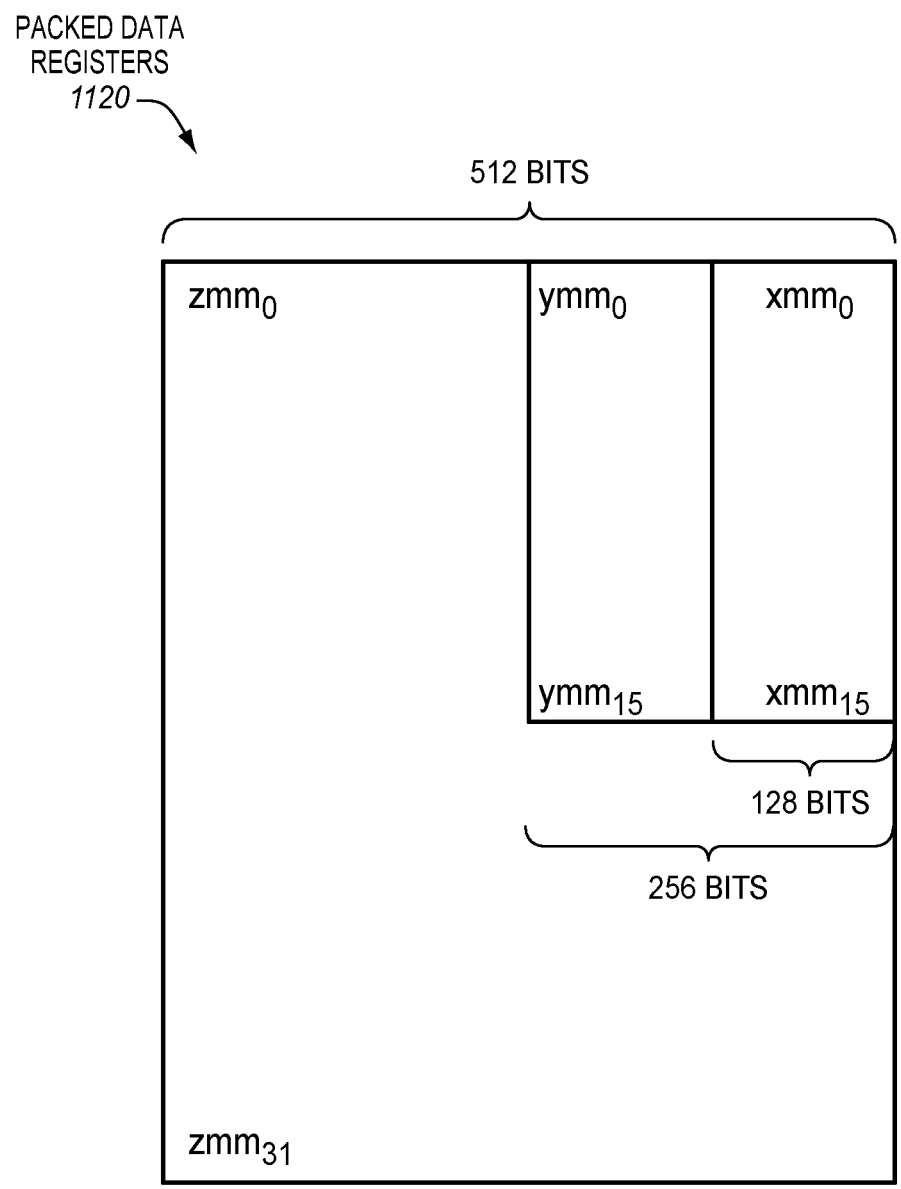
FIG. 11 is a block diagram of an example embodiment of a suitable set of packed data registers.

FIG. 11 is a block diagram of an example embodiment of a suitable set of packed data registers 1120. The packed data registers include thirty-two 512-bit packed data registers labeled ZMM0 through ZMM31. In the illustrated embodiment, the lower order 256-bits of the lower sixteen registers, namely ZMM0-ZMM15, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operative to hold 512-bit packed data, 256-bit packed data, or 128-bit packed data. The 256-bit registers YMM0-YMM15 are operative to hold 256-bit packed data or 128-bit packed data. The 128-bit registers XMM0-XMM15 are operative to hold 128-bit packed data. In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 12A illustrates an exemplary AVX instruction format including a VEX prefix 1202, real opcode field 1230, Mod R/M byte 1240, SIB byte 1250, displacement field 1262, and IMM8 1272. FIG. 12B illustrates which fields from FIG. 12A make up a full opcode field 1274 and a base operation field 1242. FIG. 12C illustrates which fields from FIG. 12A make up a register index field 1244.

VEX Prefix (Bytes 0-2) 1202 is encoded in a three-byte form. The first byte is the Format Field 1240 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1205 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1215 (VEX byte 1, bits [4:0]—mmmmm) includes content to encode an implied leading opcode byte. W Field 1264 (VEX byte 2, bit [7]—W)—is represented by the notation VEX.W, and provides different functions depending on the instruction. The role of VEX.vvvv 1220 (VEX Byte 2, bits [6:3]—vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1211b. If VEX.L 1268 Size field (VEX byte 2, bit [2]—L)=0, it indicates 128 bit vector; if VEX.L=1, it indicates 256 bit vector. Prefix encoding field 1225 (VEX byte 2, bits [1:0]—pp) provides additional bits for the base operation field.

Real Opcode Field 1230 (Byte 3) is also known as the opcode byte. Part of the opcode is specified in this field.

MOD R/M Field 1240 (Byte 4) includes MOD field 1242 (bits [7-6]), Reg field 1244 (bits [5-3]), and R/M field 1246 (bits [2-0]). The role of Reg field 1244 may include the following: encoding either the destination register operand or a source register operand (the rrr of Rrrr), or be treated as an opcode extension and not used to encode any instruction operand. The role of R/M field 1246 may include the following: encoding the instruction operand that references a memory address, or encoding either the destination register operand or a source register operand.

Scale, Index, Base (SIB)—The content of Scale field 1250 (Byte 5) includes SS1252 (bits [7-6]), which is used for memory address generation. The contents of SIB.xxx 1254 (bits [5-3]) and SIB.bbb 1256 (bits [2-0]) have been previously referred to with regard to the register indexes Xxxx and Bbbb.

The Displacement Field 1262 and the immediate field (IMM8) 1272 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
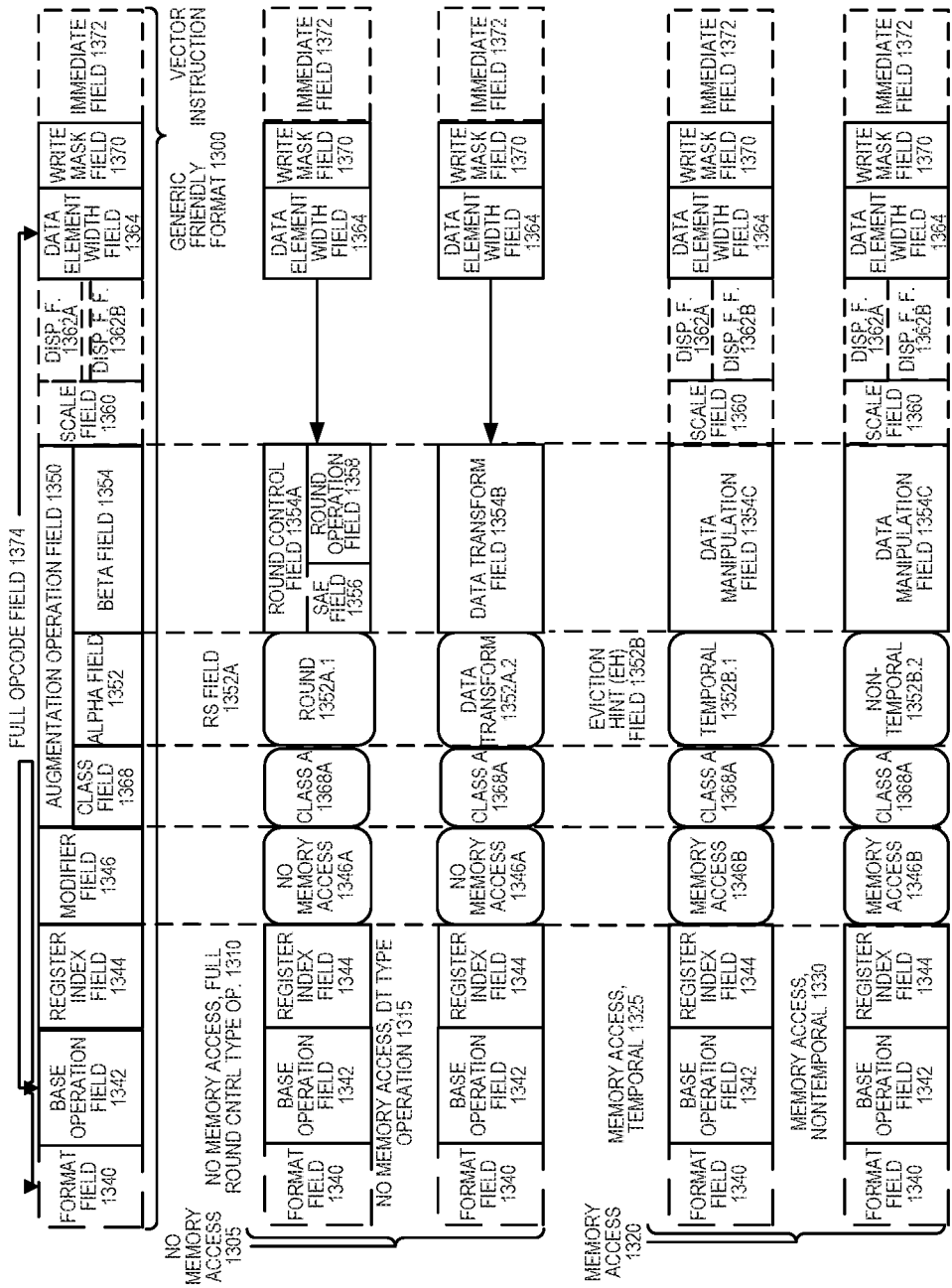
FIG. 13A-B is a block diagram illustrating an exemplary specific vector friendly instruction format and an opcode field, according to embodiments of the invention.
Figure 13B:
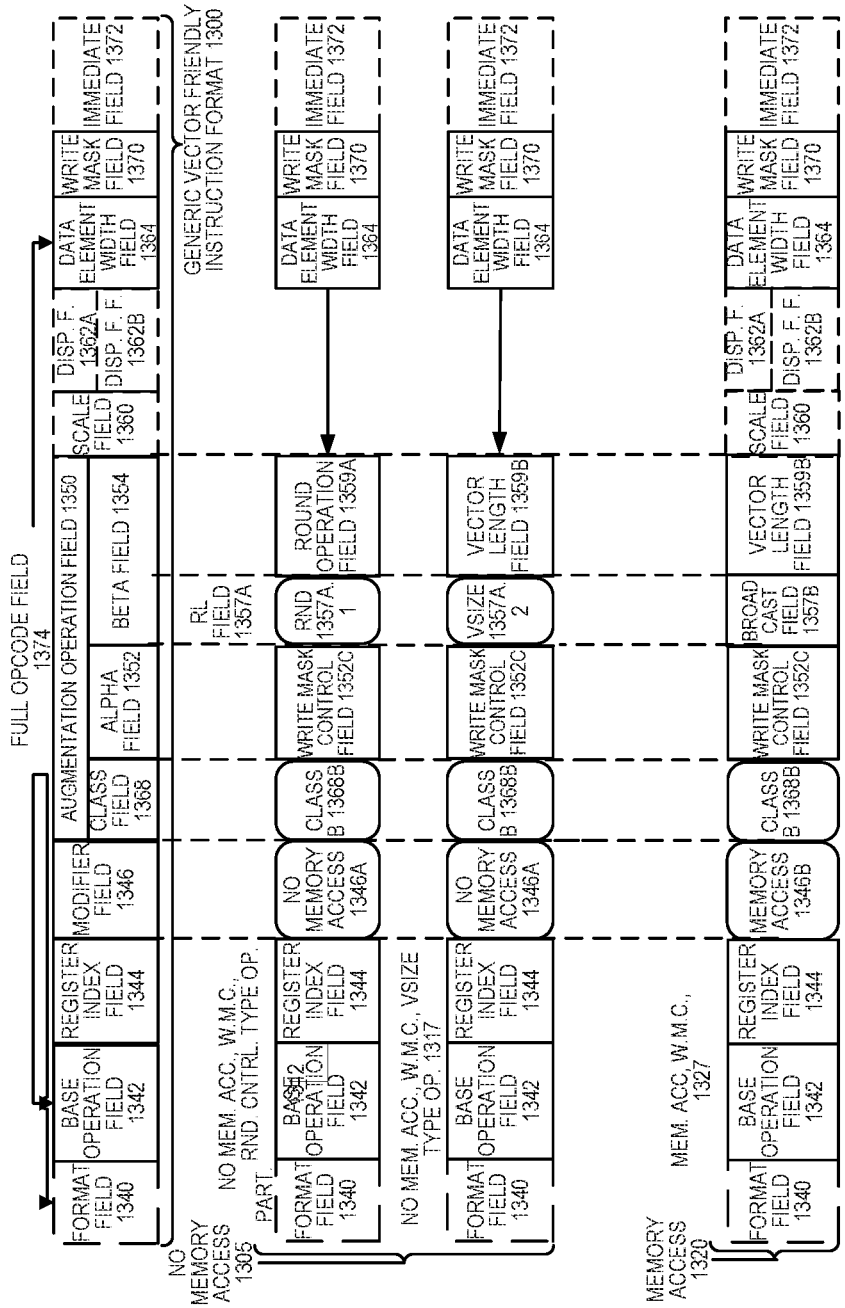

FIGS. 13A-13B are block diagrams illustrating a generic vector friendly instruction format and instruction templates thereof according to embodiments of the invention. FIG. 13A is a block diagram illustrating a generic vector friendly instruction format and class A instruction templates thereof according to embodiments of the invention; while FIG. 13B is a block diagram illustrating the generic vector friendly instruction format and class B instruction templates thereof according to embodiments of the invention. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte)

or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment of the invention, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}*\text{index}+\text{base}$).

Displacement Field 1362A—its content is used as part of memory address generation (e.g., for address generation that uses $2^{scale}*\text{index}+\text{base}+\text{displacement}$).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the invention are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments of the invention the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment of the invention where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment of the invention where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14 is a block diagram illustrating an exemplary specific vector friendly instruction format according to embodiments of the invention. FIG. 14 shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 13 into which the fields from FIG. 14 map are illustrated.

It should be understood that, although embodiments of the invention are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in one embodiment of the invention).

The second-fourth bytes (EVEX Bytes 1-3) include a number of bit fields providing specific capability.

REX field 1405 (EVEX Byte 1, bits [7-5])—consists of a EVEX.R bit field (EVEX Byte 1, bit [7]—R), EVEX.X bit field (EVEX byte 1, bit [6]—X), and 1357BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1211B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]—mmmm)—its content encodes an implied leading opcode byte (0F, 0F 38, or 0F 3).

Data element width field 1364 (EVEX byte 2, bit [7]—W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1211b. Thus, EVEX.vvvv field 1420 encodes the 4 low-order bits of the first source register specifier stored in inverted (1s complement) form. Depending on the instruction, an extra different EVEX bit field is used to extend the specifier size to 32 registers.

EVEX.U 1368 Class field (EVEX byte 2, bit [2]—U)—If EVEX.0=0, it indicates class A or EVEX.U0; if EVEX.0=1, it indicates class B or EVEX.U1.

Prefix encoding field 1425 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]—SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]—kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 137 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1372 operates as previously described.

Full Opcode Field

FIG. 14B is a block diagram illustrating the fields of the specific vector friendly instruction format 1400 that make up the full opcode field 1374 according to one embodiment of the invention. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment of the invention. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
|---|---|---|---|
| Instruction Templates that do not include the vector length field 1359B | A (FIG. 13A; U = 0) | 1310, 1315, 1325, 1330 | zmm registers (the vector length is 64 byte) |
|  | B (FIG. 13B; U = 1) | 1312 | zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

Augmentation Operation Field

Figure 14D:
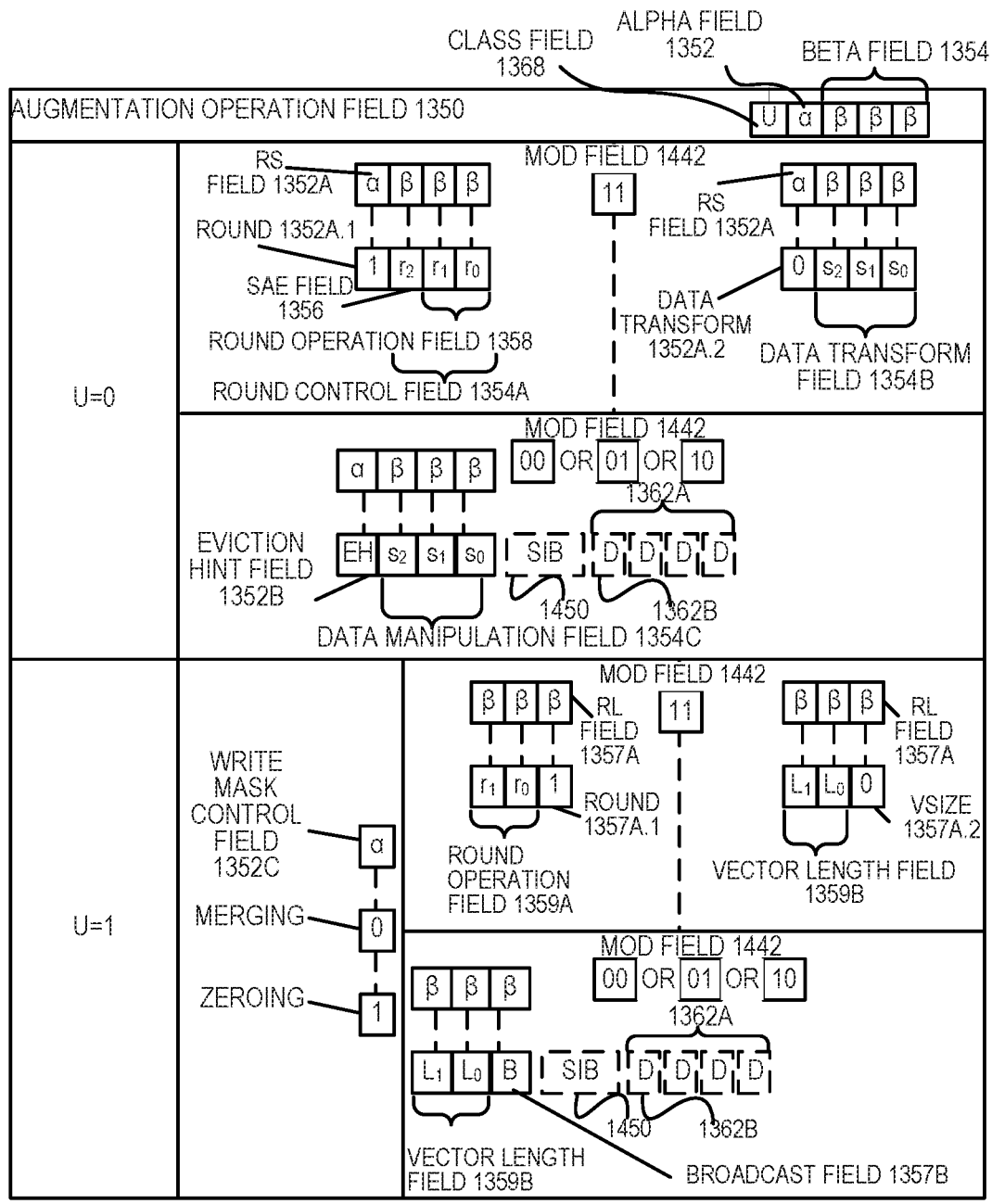

FIG. 14D is a block diagram illustrating the fields of the specific vector friendly instruction format 1400 that make up the augmentation operation field 1350 according to one embodiment of the invention. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]—EH) is interpreted as the rs field 1352A. When the rs field 1352A contains a 1 (round 1352A.1), the beta field 1354 (EVEX byte 3, bits [6:4]—SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]—SSS) is interpreted as a three bit data transform field 1354B. When U=0 and the MOD field 1442 contains 00, 01, or 10 (signifying a memory access operation), the alpha field 1352 (EVEX byte 3, bit [7]—EH) is interpreted as the eviction hint (EH) field 1352B and the beta field 1354 (EVEX byte 3, bits [6:4]—SSS) is interpreted as a three bit data manipulation field 1354C.

When U=1, the alpha field 1352 (EVEX byte 3, bit [7]—EH) is interpreted as the write mask control (Z) field 1352C. When U=1 and the MOD field 1442 contains 11 (signifying a no memory access operation), part of the beta field 1354 (EVEX byte 3, bit [4]—$S_0$) is interpreted as the RL field 1357A; when it contains a 1 (round 1357A.1) the rest of the beta field 1354 (EVEX byte 3, bit [6-5]—$S_{2-1}$) is interpreted as the round operation field 1359A, while when the RL field 1357A contains a 0 (VSIZE 1357.A2) the rest of the beta field 1354 (EVEX byte 3, bit [6-5]—$S_{2-1}$) is interpreted as the vector length field 1359B (EVEX byte 3, bit [6-5]—$L_{1-0}$). When U=1 and the MOD field 1442 contains 00, 01, or 10 (signifying a memory access operation), the beta field 1354 (EVEX byte 3, bits [6:4]—SSS) is interpreted as the vector length field 1359B (EVEX byte 3, bit [6-5]—$L_{1-0}$) and the broadcast field 1357B (EVEX byte 3, bit [4]—B).

Exemplary Register Architecture

Figure 15:
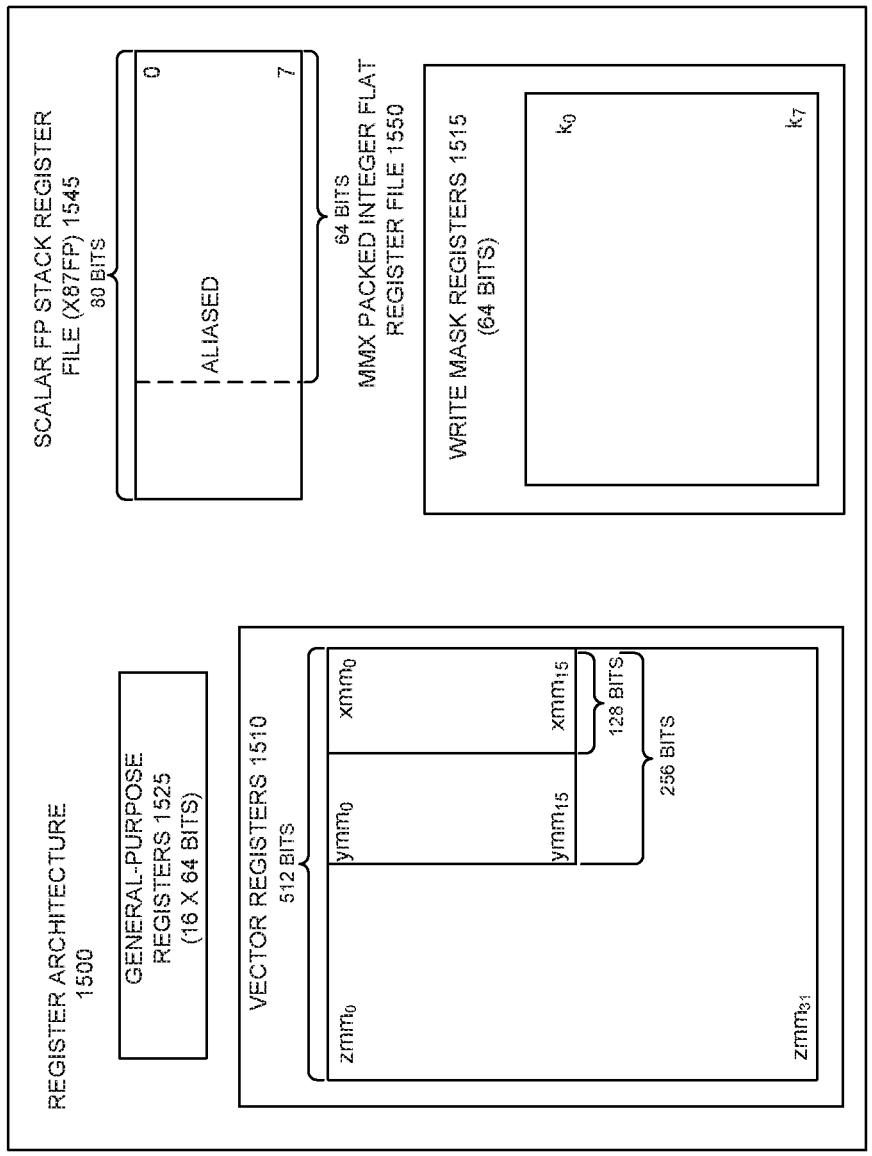
FIG. 15 is a block diagram of an embodiment of a register architecture.

FIG. 15 is a block diagram of a register architecture 1500 according to one embodiment of the invention. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 17B:
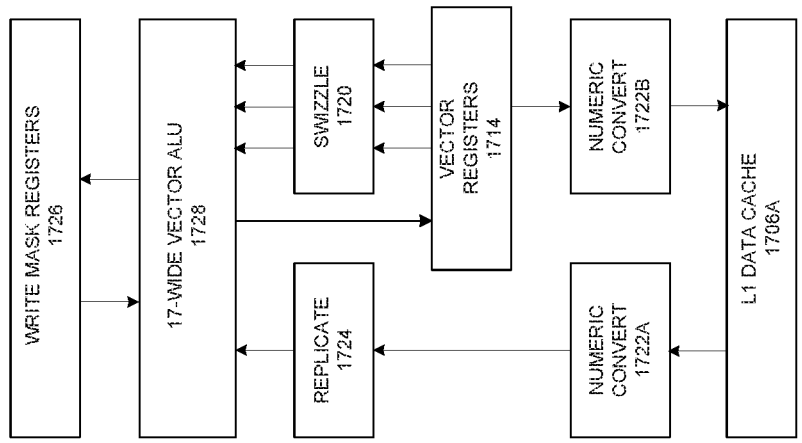
FIG. 17B is a block diagram of an embodiment of an expanded view of part of the processor core of FIG. 17A.
Figure 17A:
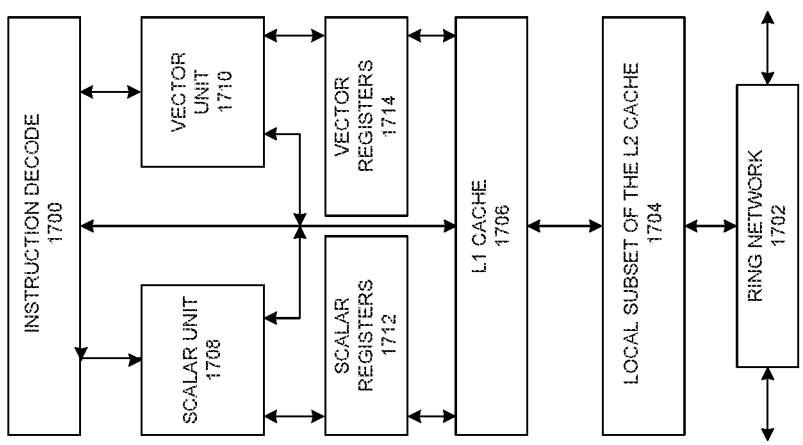
FIG. 17A is a block diagram of an embodiment of a single processor core, along with its connection to the on-die interconnect network, and with its local subset of the Level 2 (L2) cache.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 11712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Processor with Integrated Memory Controller and Graphics

Figure 18:
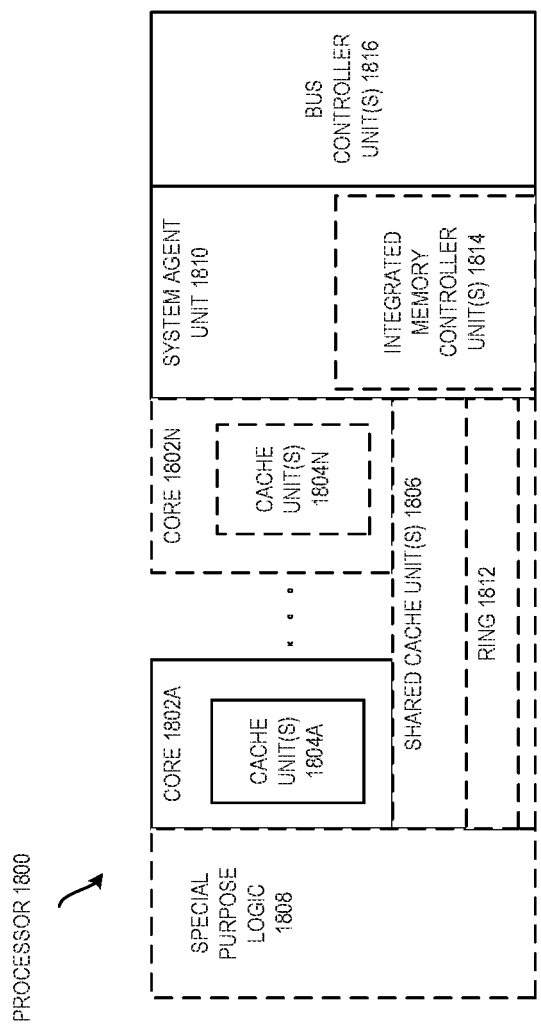
FIG. 18 is a block diagram of an embodiment of a processor that may have more than one core, may have an integrated memory controller, and may have integrated graphics.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

Figure 19:
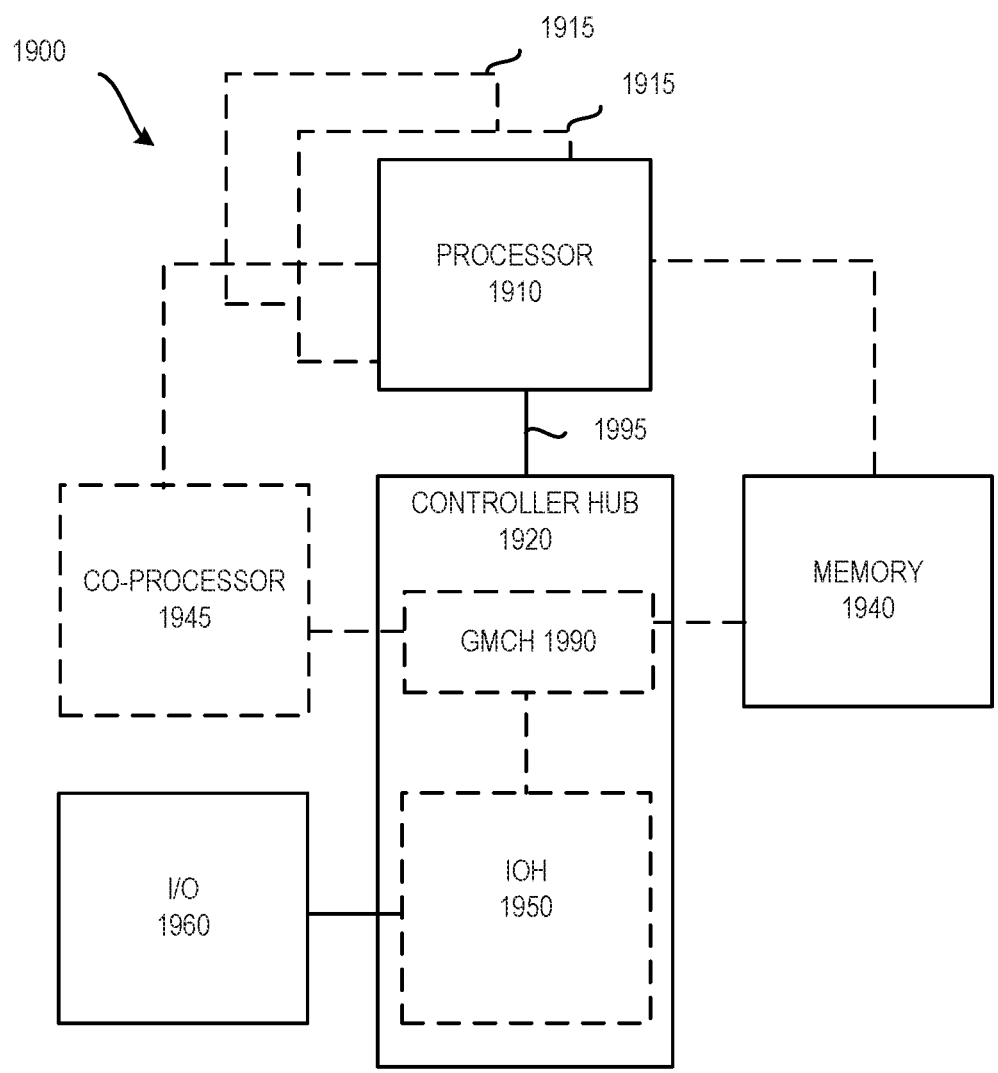
FIG. 19 is a block diagram of a first embodiment of a computer architecture.
Figure 20:
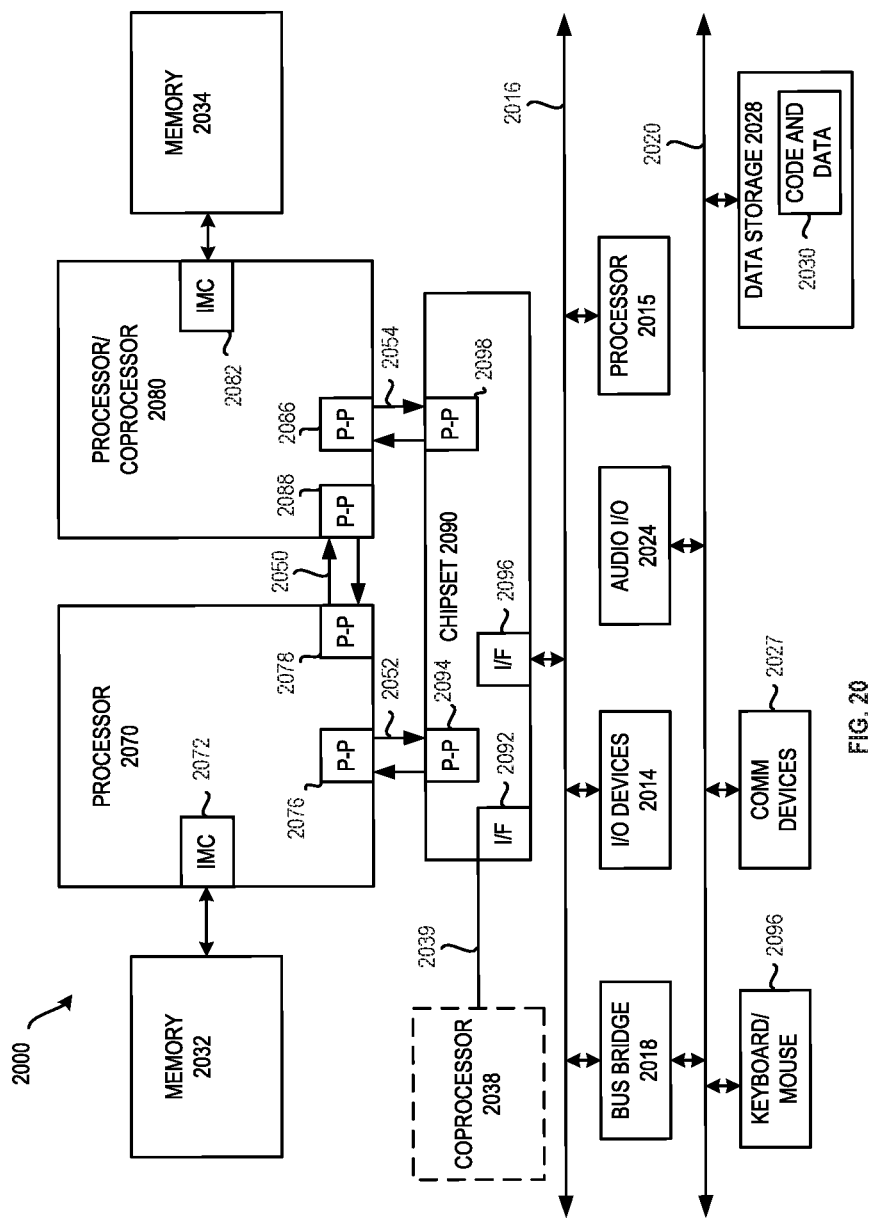
FIG. 20 is a block diagram of a second embodiment of a computer architecture.
Figure 21:
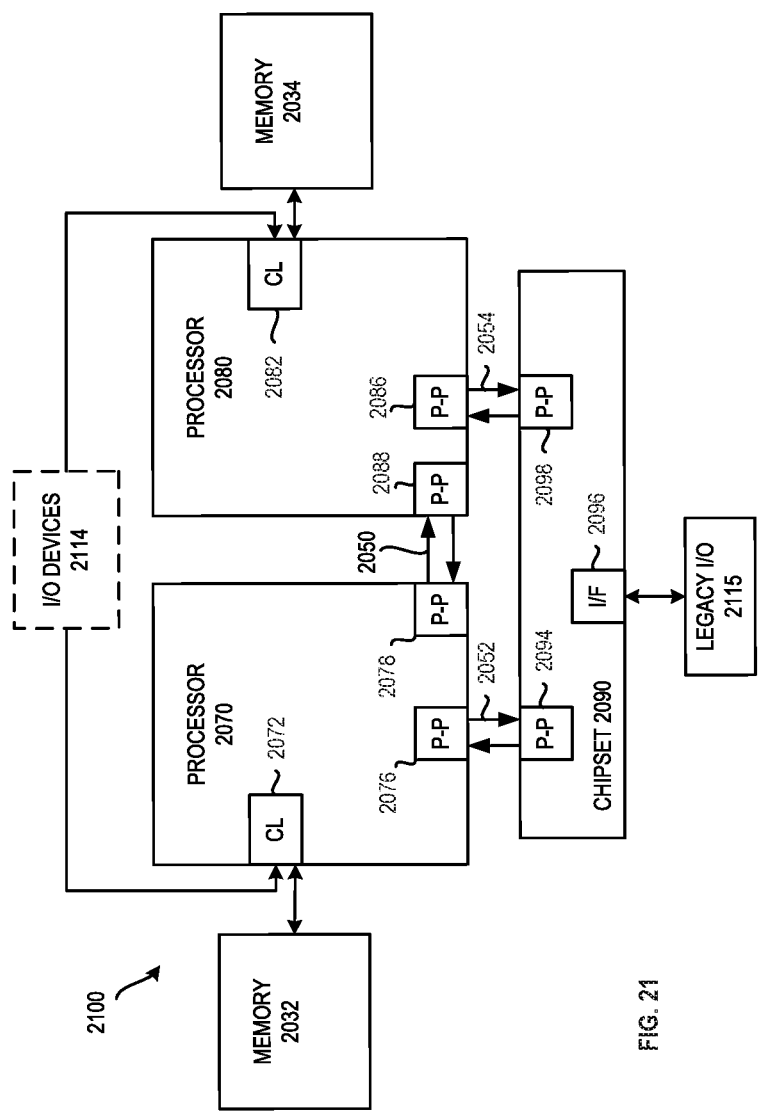
FIG. 21 is a block diagram of a third embodiment of a computer architecture.

FIGS. 19-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
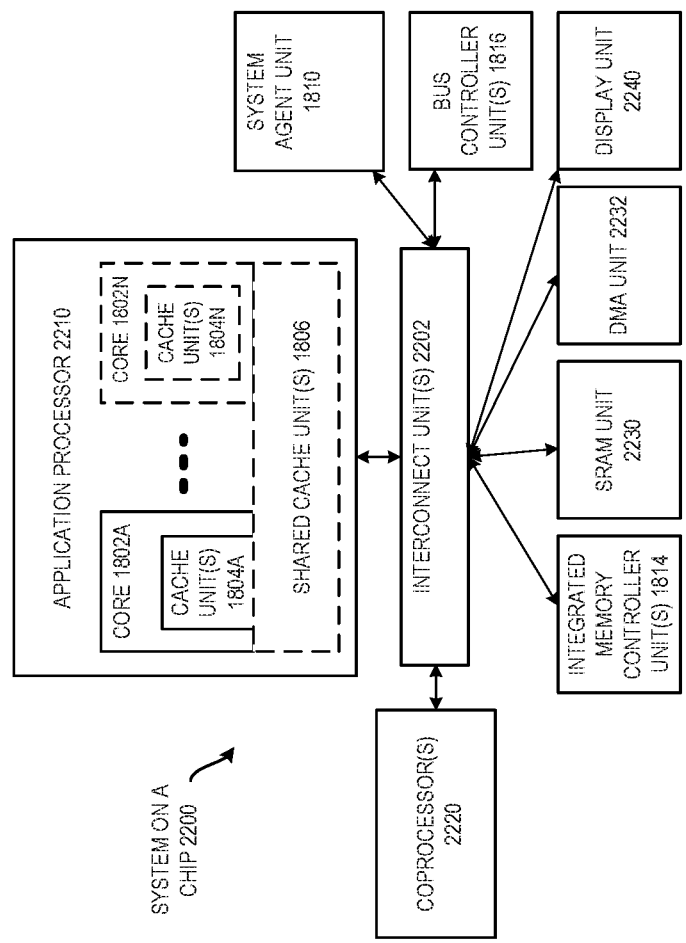
FIG. 22 is a block diagram of a fourth embodiment of a computer architecture.

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 212A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
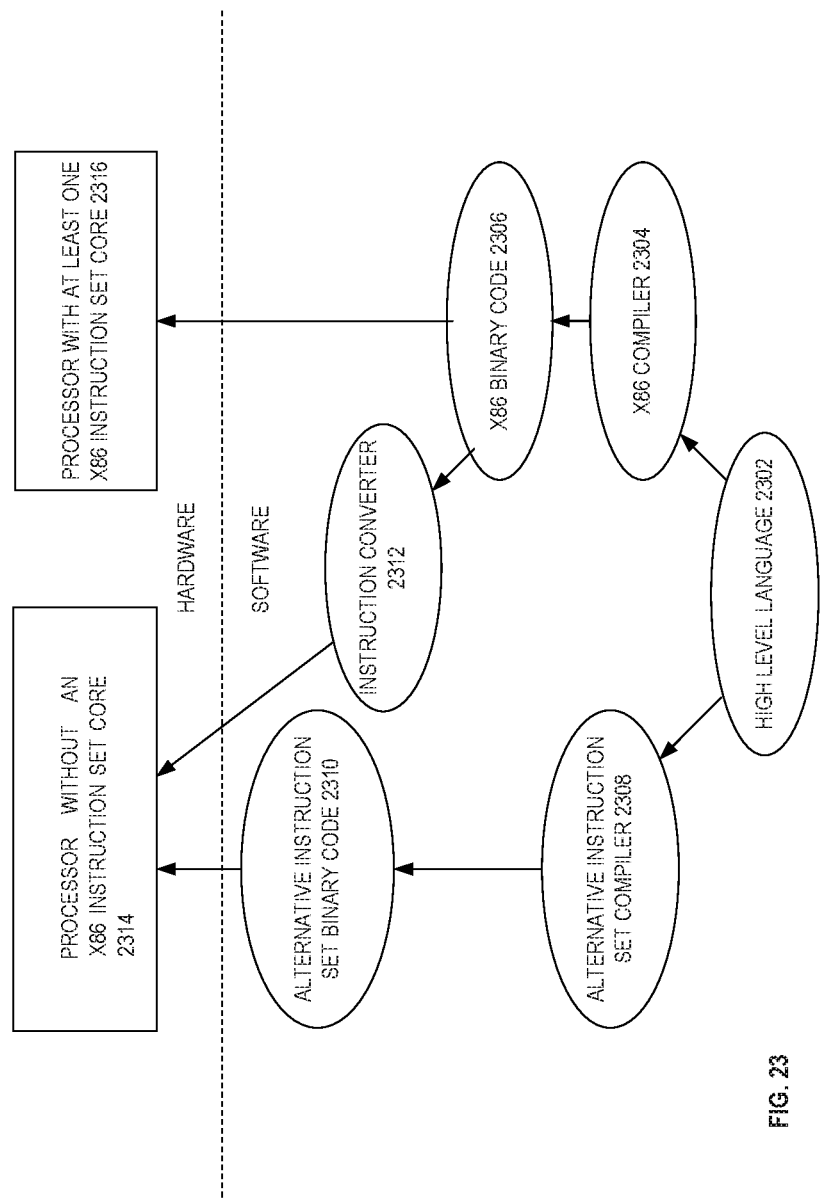
FIG. 23 is a block diagram of use of a software instruction converter to convert binary instructions in a source instruction set to binary instructions in a target instruction set, according to embodiments of the invention.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

Components, features, and details described for any of FIGS. 1-2 and 5-11 may also optionally apply to any of FIGS. 3-4. Moreover, components, features, and details described for any of the apparatus may also optionally apply to any of the methods, which in embodiments may be performed by and/or with such apparatus. Any of the processors described herein may be included in any of the computer systems disclosed herein (e.g., FIGS. 19-23). In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein. The instructions disclosed herein may have any of the features of the instruction formats shown herein (e.g., in FIGS. 12-14).

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

In the description and/or claims, the terms "logic," "unit," "module," or "component," may have been used. Each of these terms may be used to refer to hardware, firmware, software, or various combinations thereof. In example embodiments, each of these terms may refer to integrated circuitry, application specific integrated circuits, analog circuits, digital circuits, programmed logic devices, memory devices including instructions, and the like, and various combinations thereof. In some embodiments, these may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a decode unit to decode a data element comparison instruction. The data element comparison instruction is to indicate a first source packed data operand that is to include at least four data elements, is to indicate a second source packed data operand that is to include at least four data elements, and is to indicate one or more destination storage locations. The processor also includes an execution unit coupled with the decode unit. The execution unit, in response to the data element comparison instruction, is to store at least one result mask operand in the one or more destination storage locations. The at least one result mask operand is to include a different mask element for each corresponding data element in one of the first and second source packed data operands in a same relative position. Each mask element is to indicate whether the corresponding data element in the one of the first and second source packed data operands equals any of the data elements in the other of the first and second source packed data operands.

Example 2 includes the processor of Example 1, in which the execution unit, in response to the instruction, is to store two result mask operands in the one or more destination storage locations. The two result mask operands are to include a first result mask operand that is to include a different mask element for each corresponding data element in the first source packed data operand in a same relative position. Each mask element of the first result mask operand to indicate whether the corresponding data element in the first source packed data operand equals any of the data elements in the second source packed data operand. A second result mask operand is to include a different mask element for each corresponding data element in the second source packed data operand in a same relative position. Each mask element of the second result mask operand is to indicate whether the corresponding data element in the second source packed data operand equals any of the data elements in the first source packed data operand.

Example 3 includes the processor of Example 2, in which the one or more destination storage locations comprise a first mask register and a second mask register, and in which the execution unit, in response to the instruction, is to store the first result mask operand in the first mask register and is to store the second result mask operand in the second mask register.

Example 4 includes the processor of Example 2, in which the one or more destination storage locations comprise a single mask register, and in which the execution unit, in response to the instruction, is to store the first result mask operand and the second result mask operand in the single mask register.

Example 5 includes the processor of Example 4, in which the execution unit, in response to the instruction, is to store the first result mask operand in a least significant portion of the single mask register and is to store the second result mask operand in a portion of the single mask register more significant than the least significant portion.

Example 6 includes the processor of Example 1, in which the execution unit, in response to the instruction, is to store both a first result mask operand and a second result mask operand in a packed data register, and in which each data element in the packed data register is to have both a mask element of the first result mask operand and a mask element of the second result mask operand.

Example 7 includes the processor of Example 1, in which the execution unit, in response to the instruction, is to store a single result mask operand in a single mask register.

Example 8 includes the processor of Example 1, in which the execution unit, in response to the instruction, is to store the at least one result mask operand in at least one mask register, and in which an instruction set of the processor includes masked packed data instructions that are operative to indicate the at least one mask register as a storage location for a source mask operand that is to be used to mask a packed data operation.

Example 9 includes the processor of any one of Examples 1 to 8, in which the execution unit, in response to the instruction, is to store a number of result mask bits in the at least one result mask operand that is not more than a number of data elements in the first and second source packed data operands.

Example 10 includes the processor of any one of Examples 1 to 8, in which the execution unit, in response to the instruction, is to store the at least one result mask operand in which each mask element includes a single mask bit.

Example 11 includes the processor of any one of Examples 1 to 8, in which the decode unit is to decode the instruction that is to indicate the first source packed data operand that is to include at least eight data elements, and to indicate the second source packed data operand that is to include at least eight data elements.

Example 12 includes the processor of any one of Examples 1 to 8, in which the decode unit is to decode the instruction that is to indicate the first source packed data operand which is to include at least 512-bits, and is to indicate the second source packed data operand which is to include at least 512-bits.

Example 13 is a method in a processor including receiving a data element comparison instruction. The data element comparison instruction indicating a first source packed data operand including at least four data elements, indicating a second source packed data operand including at least four data elements, indicating one or more destination storage locations. The method also includes storing at least one result mask operand in the one or more destination storage locations in response to the data element comparison instruction. The at least one result mask operand including a different mask element for each corresponding data element in one of the first and second source packed data operands in a same relative position. Each mask element indicating whether the corresponding data element in the one of the first and second source packed data operands equals any of the data elements in the other of the first and second source packed data operands.

Example 14 includes the method of Example 13, in which storing includes storing a first result mask operand in the one or more destination storage locations. The first result mask operand including a different mask element for each corresponding data element in the first source packed data operand in a same relative position. Each mask element of the first result mask operand indicating whether the corresponding data element in the first source packed data operand equals any of the data elements in the second source packed data operand. Also, in which storing includes storing a second result mask operand in the one or more destination storage locations. The second result mask operand including a different mask element for each corresponding data element in the second source packed data operand in a same relative position. Each mask element of the second result mask operand indicating whether the corresponding data element in the second source packed data operand equals any of the data elements in the first source packed data operand.

Example 15 includes the method of Example 14, in which storing the first result mask operand includes storing the first result mask operand in a first mask register, and in which storing the second result mask operand includes storing the second result mask operand in a second mask register.

Example 16 includes the method of Example 14, in which storing the first result mask operand and storing the second result mask operand includes storing both the first and second result mask operands in a single mask register.

Example 17 includes the method of Example 13, in which storing the at least one result mask operand in the one or more destination storage locations includes storing both a first result mask operand and a second result mask operand in a result packed data operand.

Example 18 includes the method of Example 13, further including receiving a masked packed data instruction indicating the at least one result mask operand as a predicate operand.

Example 19 is a system to process instructions including an interconnect, and a processor coupled with the interconnect. The processor is to receive a data element comparison instruction. The instruction is to indicate a first source packed data operand that is to include at least four data elements, is to indicate a second source packed data operand that is to include at least four data elements, and is to indicate one or more destination storage locations. The processor, in response to the instruction, is to store at least one result mask operand in the one or more destination storage locations. The at least one result mask operand is to include a different mask bit for each corresponding data element in one of the first and second source packed data operands in a same relative position. Each mask bit is to indicate whether the corresponding data element in the one of the first and second source packed data operands equals any of the data elements in the other of the first and second source packed data operands. The system also includes a dynamic random access memory (DRAM) coupled with the interconnect. The DRAM optionally stores a sparse vector-sparse vector arithmetic algorithm. The sparse vector-sparse vector arithmetic algorithm optionally includes a masked data element consolidation instruction that is to indicate the at least one result mask operand as a source operand to mask a data element consolidation operation.

Example 20 includes the system of Example 19, in which the execution unit in response to the instruction is to store two result mask operands each corresponding to a different one of the source packed data operands, in which the two result mask operands are to be stored in at least one mask register.

Example 21 is an article of manufacture including a non-transitory machine-readable storage medium. The non-transitory machine-readable storage medium storing a data element comparison instruction. The instruction is to indicate a first source packed data operand that is to include at least four data elements, to indicate a second source packed data operand that is to include at least four data elements, and to indicate one or more destination storage locations. The instruction if executed by a machine is to cause the machine to perform operations including store a first result mask operand in the one or more destination storage locations. The first result mask operand to include a different mask bit for each corresponding data element in the first source packed data operand in a same relative position. Each mask bit to indicating whether the corresponding data element in the first source packed data operand equals any of the data elements in the second source packed data operand.

Example 22 includes the article of manufacture of Example 21, in which the instruction if executed by a machine is to cause the machine to perform operations including store a second result mask operand in the one or more destination storage locations. Also, optionally in which the one or more destination storage locations comprise at least one mask register. Also, optionally in which the first and second result mask operands together have no more mask bits than a number of data elements in the first and second source packed data operands.

Example 23 includes the processor of any one of Examples 1 to 8, further including an optional branch prediction unit to predict branches, and an optional instruction prefetch unit, coupled with the branch prediction unit, the instruction prefetch unit to prefetch instructions including the data element comparison instruction. The processor may also optionally include a optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the data element comparison instruction, in some cases from one of the L1 instruction cache and the L2 cache, and to provide the data element comparison instruction to the decode unit. The processor may also optionally include a register rename unit to rename registers, an optional scheduler to schedule one or more operations that have been decoded from the data element comparison instruction for execution, and an optional commit unit to commit execution results of the data element comparison instruction.

Example 24 includes a system-on-chip that includes at least one interconnect, the processor of any one of Examples 1 to 8 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 25 is a processor or other apparatus to perform or operative to perform the method of any one of Examples 13 to 18.

Example 26 is a processor or other apparatus that includes means for performing the method of any one of Examples 13 to 18.

Example 27 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 13 to 18.

Example 28 is a processor or other apparatus substantially as described herein.

Example 29 is a processor or other apparatus that is operative to perform any method substantially as described herein.

Example 30 is a processor or other apparatus to perform (e.g., that has components to perform or that is operative to perform) any data element comparison instruction substantially as described herein.

Example 31 is a computer system or other electronic device that includes a processor having a decode unit to decode instructions of a first instruction set. The processor also has one or more execution units. The electronic device also includes a storage device coupled with the processor. The storage device is to store a first instruction, which may be any of the data element comparison instructions substantially as disclosed herein, and which is to be of a second instruction set. The storage device is also to store instructions to convert the first instruction into one or more instructions of the first instruction set. The one or more instructions of the first instruction set, when performed by the processor, are to cause the processor to store any of the results of the first instruction disclosed herein.

What is claimed is:

1. A processor comprising:
    a decode unit on a die to decode an instruction, the instruction to indicate a first source packed data operand that is to have a first plurality of data elements, a second source packed data operand that is to have a second plurality of data elements, a first mask register, and a second mask register; and
    an execution unit on the die and coupled with the decode unit, the execution unit to perform the instruction to generate and store:
        a first result in the first mask register, the first result to include a different mask element for each corresponding data element in the first source packed data operand in a same relative position, each mask element of the first result to indicate whether the corresponding data element in the first source packed data operand equals any of the data elements in the second source packed data operand; and
        a second result in the second mask register, the second result to include a different mask element for each corresponding data element in the second source packed data operand in a same relative position, each mask element of the second result to indicate whether the corresponding data element in the second source packed data operand equals any of the data elements in the first source packed data operand.

2. The processor of claim 1, wherein the execution unit is to perform the instruction to compare each data element of the first plurality of data elements with each data element of the second plurality of data elements.

3. The processor of claim 1, wherein the execution unit is to perform the instruction to store the first result in which each mask element of the first result is to be:
    set to one to indicate that the corresponding data element in the first source packed data operand equals any of the data elements in the second source packed data operand; or
    cleared to zero to indicate that the corresponding data element in the first source packed data operand does not equal any of the data elements in the second source packed data operand.

4. The processor of claim 1, wherein the execution unit is to perform the instruction to store the first result in which each mask element comprises a single bit.

5. The processor of claim 1, wherein the decode unit is to decode the instruction that is to indicate the first mask register as being one of a plurality of architectural mask registers.

6. The processor of claim 1, wherein the instruction is included in an instruction set with a plurality of instructions that each have a field to specify one of a plurality of architectural mask registers as a source of a mask operand that is to be used to mask an associated packed data operation.

7. The processor of claim 1, wherein the decode unit is to decode the instruction that is to indicate the first source packed data operand and the second source packed data operand that are each to have 32-bit data elements.

8. The processor of claim 1, wherein the decode unit is to decode the instruction that is to indicate the first source packed data operand and the second source packed data operand that are each to have 64-bit data elements.

9. The processor of claim 1, wherein the decode unit is to decode the instruction that is to indicate the first and second source packed data operands that are each to include at least 512-bits.

10. The processor of claim 1, wherein the decode unit includes circuitry, and wherein the execution unit includes circuitry.

11. A system comprising:
the processor of claim 1; and
a dynamic random access memory (DRAM) coupled with the processor.

12. A processor comprising:
a decode unit on a die to decode an instruction, the instruction to indicate a first vector register that is to have a first source packed data operand that is to include a first plurality of data elements, one of a second vector register and a memory location that is to have a second source packed data operand that is to include a second plurality of data elements, a first mask register, and a second mask register; and
an execution unit on the die and coupled with the decode unit, the execution unit to perform the instruction to generate and store:
a first result in the first mask register, the first result to include a different mask bit for each corresponding data element in the first source packed data operand in a same relative position, each mask bit of the first result to indicate whether the corresponding data element in the first source packed data operand equals any of the data elements in the second source packed data operand, wherein each mask bit of the first result is to be set to one to indicate that the corresponding data element in the first source packed data operand equals any of the data elements in the second source packed data operand, or cleared to zero to indicate that the corresponding data element in the first source packed data operand does not equal any of the data elements in the second source packed data operand; and
a second result in the second mask register, the second result to include a different mask bit for each corresponding data element in the second source packed data operand in a same relative position, each mask bit of the second result to indicate whether the corresponding data element in the second source packed data operand equals any of the data elements in the first source packed data operand, wherein each mask bit of the second result is to be set to one to indicate that the corresponding data element in the second source packed data operand equals any of the data elements in the first source packed data operand, or cleared to zero to indicate that the corresponding data element in the second source packed data operand and does not equal any of the data elements in the first source packed data operand.

13. The processor of claim 12, wherein the execution unit is to perform the instruction to compare each data element of the first plurality of data elements with each data element of the second plurality of data elements.

14. The processor of claim 12, wherein the instruction is included in an instruction set with a plurality of instructions that each have a field to specify one of a plurality of architectural mask registers as a source of a mask operand that is to be used to mask an associated packed data operation.

15. The processor of claim 12, wherein the decode unit is to decode the instruction that is to indicate the first source packed data operand and the second source packed data operand that are each to have one of 32-bit data elements and 64-bit data elements.

16. The processor of claim 12, wherein the decode unit is to decode the instruction that is to indicate the first and second source packed data operands that are each to include at least 512-bits.

17. A system comprising:
a processor including:
a decode unit to decode instructions of a first instruction set; and
one or more execution units to perform the decoded instructions of the first instruction set;
a storage device coupled with the processor, the storage device to store:
a first instruction of a second instruction set, the first instruction to indicate a first source packed data operand that is to have a first plurality of data elements, a second source packed data operand that is to have a second plurality of data elements;
instructions to convert the first instruction into one or more instructions of the first instruction set, the one or more instructions of the first instruction set, when performed by the processor, are to cause the processor to generate and store:
a first result mask, the first result mask to include a different mask element for each corresponding data element in the first source packed data operand in a same relative position, each mask element of the first result mask to indicate whether the corresponding data element in the first source packed data operand equals any of the data elements in the second source packed data operand; and
a second result mask, the second result mask to include a different mask element for each corresponding data element in the second source packed data operand in a same relative position, each mask element of the second result mask to indicate whether the corresponding data element in the second source packed data operand equals any of the data elements in the first source packed data operand.

18. The processor of claim 17, wherein processor is to store the first result mask in which each mask element comprises a single bit.

19. The processor of claim 17, wherein processor is to compare each data element of the first plurality of data elements with each data element of the second plurality of data elements.

20. The processor of claim 17, wherein processor is to store the first result mask in which each mask element of the first result mask is to be:

set to one to indicate that the corresponding data element in the first source packed data operand equals any of the data elements in the second source packed data operand; or cleared to zero to indicate that the corresponding data element in the first source packed data operand does not equal any of the data elements in the second source packed data operand.

\* \* \* \* \*